(12) United States Patent
Ejiri

(10) Patent No.: US 6,932,315 B2
(45) Date of Patent: Aug. 23, 2005

(54) MANUAL OPENING APPARATUS FOR A NORMALLY-CLOSED VALVE

(75) Inventor: Takashi Ejiri, Tokyo (JP)

(73) Assignees: Fujikura Rubber Ltd., Tokyo (JP); Neriki Valve Co., Ltd., Hyogo (JP)

( * ) Notice: Subject to any disclaimer, the term of this patent is extended or adjusted under 35 U.S.C. 154(b) by 0 days.

(21) Appl. No.: 10/916,101

(22) Filed: Aug. 11, 2004

(65) Prior Publication Data

US 2005/0006616 A1 Jan. 13, 2005

Related U.S. Application Data

(62) Division of application No. 09/815,735, filed on Mar. 23, 2001, now Pat. No. 6,805,158.

(30) Foreign Application Priority Data

| Mar. 27, 2000 | (JP) | .................................. 2000-85970 |
| Dec. 27, 2000 | (JP) | ................................ 2000-397802 |
| Dec. 27, 2000 | (JP) | ................................ 2000-397803 |

(51) Int. Cl.⁷ .............................................. F16K 37/00
(52) U.S. Cl. ....................... 251/14; 137/269; 251/63.4; 251/63.5; 251/291
(58) Field of Search ........................ 251/14, 63.4, 63.5, 251/291; 137/269, 557, 556

(56) References Cited

U.S. PATENT DOCUMENTS

| 2,710,627 | A | * | 6/1955 | Wagner et al. ............... 137/540 |
| 3,451,423 | A | * | 6/1969 | Priese ........................ 137/556 |
| 3,737,140 | A | | 6/1973 | Toth |
| 4,121,615 | A | * | 10/1978 | Bergeron ..................... 137/555 |
| 4,213,480 | A | * | 7/1980 | Orum et al. ................. 137/556 |
| RE31,845 | E | * | 3/1985 | Peters ......................... 137/557 |
| 4,660,600 | A | * | 4/1987 | Bergeron ..................... 137/552 |
| 5,516,075 | A | * | 5/1996 | Itoi et al. ...................... 251/58 |
| 6,015,134 | A | * | 1/2000 | Johnson ..................... 251/61.4 |

FOREIGN PATENT DOCUMENTS

| EP | 0 882 921 A2 | 12/1998 |
| EP | 0 962 686 A2 | 12/1999 |
| FR | 2203482 | 5/1974 |
| GB | 1010721 A | 11/1965 |
| JP | 11 051239 | 2/1999 |
| JP | 11-82804 | 3/1999 |
| WO | WO 98 54495 | 12/1998 |

* cited by examiner

Primary Examiner—A. Michael Chambers
(74) Attorney, Agent, or Firm—McCormick, Paulding & Huber LLP

(57) ABSTRACT

An apparatus for manually opening a normally-closed valve includes a value and a hand-operated valve opening jig. The valve includes a working rod for operating a valve element which is moved to close and open a conduit; a cylindrical holder fixed to the working rod, and to which the hand-operated valve opening jig can be detachably attached from the outside of the housing; a biasing member which biases the working rod to close the conduit; and a pressure chamber which is supplied with a working fluid to move the working rod to make the valve element open the conduit. The hand-operated valve opening jig includes a manual-opening attachment which can be detachably attached to the cylindrical holder; and an operational member which is operated to move the working rod in a direction to make the valve element open the conduit via said manual-opening attachment.

6 Claims, 20 Drawing Sheets

MANUAL OPENING APPARATUS FOR A NORMALLY-CLOSED VALVE

The present application claims priority under 35 U.S.C § 119 and is based upon and incorporates by reference Japanese Patent Application No. 2000-85970 filed on Mar. 27, 2000; Japanese Patent Application No. 2000-397802 filed on Dec. 27, 2000; and Japanese Patent Application No. 2000-397803 filed on Dec. 27, 2000.

BACKGROUND OF THE INVENTION

1. Field of the Invention

The present invention relates to an apparatus with which a normally-closed valve can be manually opened.

2. Description of the Related Art

Various types of stop valves having a structure in which a valve element is normally biased in an opening or closing direction by a spring force so that an associated conduit is closed or opened when the valve element is acted upon by the pressure of a working fluid against the spring force are known in the art. However, in such types of conventional stop valves, the only way to check the operational status of the stop valve is to read a gauge, e.g., a flowmeter, or a pressure gauge.

Furthermore, various types of normally-closed valves having a structure in which a valve element is normally closed by a spring force so that the associated conduit is opened when the valve element is acted upon by the pressure of a working fluid against the spring force are known in the art. In such types of conventional normally-closed valves, under conditions which disallow the valve to be supplied with any working fluid, it is difficult to open the valve in the case where the value needs to be opened. Specifically, in a normally-closed valve whose pressure for closing the valve is high (i.e., the spring force for closing the value is great), it is more difficult to open the valve when it needs to be opened under the same conditions, and moreover, it is extremely difficult to adjust and maintain the opening state (open width) of the valve.

SUMMARY OF THE INVENTION

An object of the present invention is to provide an apparatus having a simple structure with which the operational status of a stop valve (e.g., whether the valve is open or closed) can be visually checked. Another object of the present invention is to provide an apparatus with which a normally-closed valve can be manually opened, and which makes it possible to adjust and maintain the opening of the valve easily.

To achieve the object mentioned above, a stop valve is provided, including a working rod for operating a valve element which is moved to close and open a main conduit; a biasing member which biases the working rod in a direction to make the valve element one of close and open the main conduit; a piston body which is coupled to the working rod and slidably fitted in a housing of the stop valve; a pressure chamber formed within the housing by the piston body; a pressure supplying device which supplies a working fluid to the pressure chamber to move the working rod in a direction against a biasing force of the biasing member; and a visual checking member which is integral with the working rod to project from the housing in accordance with movement of the working rod, wherein an amount of projection of the visual checking member varies in accordance with an axial position of the working rod.

Preferably, the visual checking member fully retreats into the housing when the working rod is in one of a valve-open position and a valve-closed position, and the visual checking member projects from the housing when the working rod is in the other of the valve-open position and the valve-closed position.

In an embodiment, the visual checking member is formed as a cylindrical member which is coaxial to the working rod. The working rod includes a control conduit which is connected with the pressure chamber, and an external tube is connected to the working rod to be positioned in the visual checking member and to be connected with the control conduit.

Preferably, a cylindrical holder is further provided, which is coaxially fixed to the working rod, wherein the visual checking member is formed as a cylindrical member, and is fixedly attached to the cylindrical holder.

In an embodiment, the biasing member biases the working rod in the first direction to make the valve element close the main conduit. The stop valve further includes a hand-operated valve opening jig which includes a manual-opening attachment which can be detachably attached to the cylindrical holder, and an operational member which is operated to move the working rod in a direction to make the valve element open the main conduit via the manual-opening attachment.

Preferably, a hand-operated valve opening jig is further provided, which includes a rotational member having a cylindrical surface which comes into contact with an operational mount mounted on the housing, the rotational member being pivoted about the manual-opening attachment via a pivot provided at a position which deviates from an approximate center of the cylindrical surface toward the cylindrical holder, and an operational member which is operated to couple the manual-opening attachment to the cylindrical holder, and is operated to rotate the rotational member with the cylindrical surface contacting the operational mount.

In an embodiment, the hand-operated valve opening jig includes a locking shaft which is screwed into the rotational member so that a tip end of the locking shaft can be engaged with a stopper surface formed on the manual-opening attachment. The stopper surface is formed so that a distance between the stopper surface and the tip end of the locking shaft increases as the cylindrical holder is moved in a valve-opening direction via the manual-opening attachment and the pivot when the rotational member is rotated with the cylindrical surface thereof remaining in contact with the operational mount, and the distance varies in accordance with an amount of screw-engagement of the locking shaft with respect to the rotational member.

Preferably, the locking shaft is formed integral with the operational member.

In an embodiment, the hand-operated valve opening jig includes a rotational member having a cylindrical surface which comes into contact with an operational mount mounted on the housing, the rotational member being pivoted about the manual-opening attachment via a pivot provided at a position which deviates from an approximate center of the cylindrical surface toward the cylindrical holder; a locking arm which is pivoted within the rotational member, wherein one end of the locking arm can be engaged with the stopper surface of the manual-opening attachment; and a spring which biases the locking arm so that the one end of the locking arm is biased in a direction to be engaged with the stopper surface of the manual-opening attachment. The stopper surface is formed so that a distance between the stopper surface and the pivot point of the locking arm increases as the cylindrical holder is moved in a valve-opening direction via the manual-opening attachment and the pivot when the rotational member is rotated with the cylindrical surface thereof remaining in contact with the operational mount, and a distance between the one end of the locking arm and the stopper surface increases if the locking arm is rotated manually against spring force of the spring.

Preferably, the operational lever is fixed to the rotational member in order to manually rotate the rotational member, the locking arm being positioned in the operational lever.

In an embodiment, the stop valve includes a power-assisted device with which the biasing force of the biasing member is multiplied to be transmitted to the working rod.

Preferably, the visual checking member is colored.

Preferably, the stop valve further includes a stationary bearing member which is provided in the housing, wherein the piston body and the working rod are relatively movable with respect to the stationary bearing member; a gap formed between the piston body and the stationary bearing member via which the working fluid is supplied to the pressure chamber; at least one slit formed on the stationary bearing member to be connected with the gap so that the working fluid is supplied to the pressure chamber via the gap and the at least one slit; and a sealing member supported by the piston body, wherein the sealing member opens one end of the gap to make the pressure chamber connect with a control conduit via the gap and the at least one slit when the piston body is positioned at a limit of a movable range thereof due to the biasing force of the biasing member, and wherein the sealing member closes the one end of the gap to make the pressure chamber connect with the control conduit via only the at least one slit when the piston body moves from the limit of the movable range, wherein the pressure chamber is defined by the piston body, the housing and the stationary bearing member.

Preferably, the sealing member is formed as an annular sealing member which is fitted in an annular groove formed on an inner peripheral surface of the piston body to face the gap.

Preferably, the stop valve further includes a line joint which is positioned in the visual checking member and coupled to the working rod to be connected with the control conduit, one end of the external tube being connected to the working rod via the line joint.

According to another aspect of the present invention, an apparatus is provided for manually opening a normally-closed valve, the apparatus including the normally-closed valve and a hand-operated valve opening jig. The normally-closed valve includes a working rod for operating a valve element which is moved to close and open a conduit; a cylindrical holder which is coaxially fixed to the working rod, and to which the hand-operated valve opening jig can be detachably-attached from the outside of the housing; a biasing member which biases the working rod in a first direction to make the valve element close the conduit; and a pressure chamber which is formed within the housing, and is supplied with a working fluid to move the working rod in a second direction to make the valve element open the conduit. The hand-operated valve opening jig includes a manual-opening attachment which can be detachably attached to the cylindrical holder; a rotational member having a cylindrical surface which comes into contact with an operational mount mounted on the housing, the rotational member being pivoted about the manual-opening attachment via a pivot provided at a position which deviates from an approximate center of the cylindrical surface toward the cylindrical holder; and an operational member which is operated to couple the manual-opening attachment to the cylindrical holder, and is operated to rotate the rotational member with the cylindrical surface contacting the operational mount.

In an embodiment, the hand-operated valve opening jig includes a locking shaft which is screwed into the rotational member so that a tip end of the locking shaft can be engaged with a stopper surface formed on the manual-opening attachment. The stopper surface is formed so that a distance between the stopper surface and the tip end of the locking shaft increases as the cylindrical holder 51 is moved in a valve-opening direction via the manual-opening attachment and the pivot when the rotational member is rotated with the cylindrical surface thereof remaining in contact with the operational mount, and wherein the distance varies in accordance with an amount of screw-engagement of the locking shaft with respect to the rotational member.

Preferably, the locking shaft is formed integral with the operational member.

In an embodiment, the hand-operated valve opening jig includes a locking arm which is pivoted within the rotational member, wherein one end of the locking arm can be engaged with the stopper surface of the manual-opening attachment; and a spring which biases the locking arm so that the one end of the locking arm is biased in a direction to be engaged with the stopper surface of the manual-opening attachment. The stopper surface is formed so that a distance between the stopper surface and the pivot point of the locking arm increases as the cylindrical holder is moved in a valve-opening direction via the manual-opening attachment and the pivot when the rotational member is rotated with the cylindrical surface thereof remaining in contact with the operational mount, and wherein a distance between the one end of the locking arm and the stopper surface increases if the locking arm is rotated manually against spring force of the spring.

In an embodiment, the hand-operated valve opening jig further includes an operational lever fixed to the rotational member for manually rotating the rotational member, the locking arm being positioned in the operational lever.

In an embodiment, the stop valve includes a power-assisted device with which the biasing force of the biasing member is multiplied to be transmitted to the working rod.

According to another aspect of the present invention, a stop valve is provided, including a working rod for operating a valve element which is moved to close and open a conduit; a biasing member which biases the working rod in a first direction to make the valve element close the conduit; a pressure chamber formed within a housing of the stop valve; a pressure supplying device which supplies a working fluid to the pressure chamber to move the working rod in a second direction against a biasing force of the biasing member; and a moving member which moves together with the working rod to project out of and retreat into the housing in accordance with movement of the working rod.

According to another aspect of the present invention, a stop valve is provided, including a working rod for operating a valve element which is moved to close and open a conduit; and a moving member which moves together with the working rod so that the moving member retracts into a housing of the stop valve when the valve element is moved to close the conduit and so that at least part of the moving member projects out of the housing when the valve element is moved to open the conduit.

The present disclosure relates to subject matter contained in Japanese Patent Applications Nos. 2000-85970 (filed on Mar. 27, 2000), 2000-397802 (filed on Dec. 27, 2000) and 2000-397803 (filed on Dec. 27, 2000) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
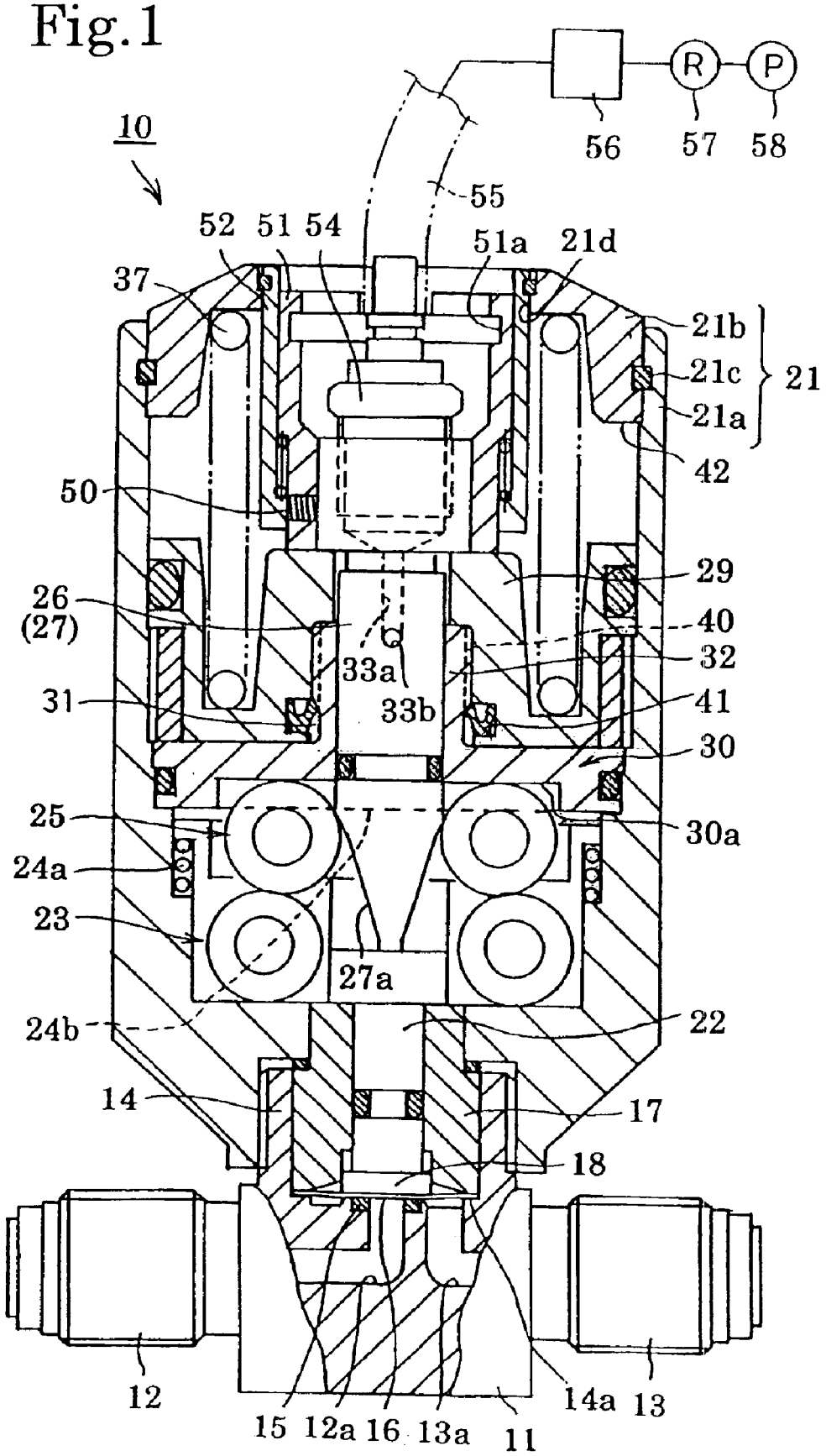
FIG. 1 is a longitudinal cross sectional view of the first embodiment of a normally-closed type of power-assisted slow operation valve to which the present invention is applied, showing a valve closed state thereof.

The first embodiment of a stop valve (power-assisted slow operation valve) 10 to which the present invention is applied will be hereinafter discussed with reference to FIGS. 1 through 13. The power-assisted slow operation valve (stop valve) 10 is a normally-closed type valve and opens slowly when opened by the pressure of a working fluid. The basic structure of the stop valve 10 has been proposed in Japanese Unexamined Patent Publication No. 11-82804, the assignee of which is the same as that of the present invention. First of all, the overall structure of the stop valve 10 will be hereinafter discussed.

The stop valve 10 is provided at the bottom thereof with a conduit block 11. The conduit block 11 is provided on opposite sides thereof with two conduit connecting ports 12 and 13 that are positioned on the same axis. The conduit block 11 is further provided with a stop valve connecting port 14 whose axis extends perpendicular to the axis of the two conduit connecting ports 12 and 13. Two conduits 12a and 13a (conduits 12a and 13a constitute a main conduit of the stop valve 10) extend in the two conduit connecting ports 12 and 13, respectively, and the inner ends of the two conduits 12a and 13a are open to the stop valve connecting port 14. The inner open end of the conduit 12a is provided with an annular valve seat 15. The stop valve connecting port 14 is provided with a disk-shaped metal diaphragm 16 which surrounds the annular valve seat 15 and the inner open end of the conduit 13a, a retainer 17 which holds a peripheral edge of the metal diaphragm 16 against an annular seat 14a of the stop valve connecting port 14, and a valve element 18 which is positioned in the retainer 17 to be supported thereby in a movable manner. In the present embodiment, a high-pressure fluid is supplied to the conduit connecting port 12 to flow from the conduit connecting port 12 to the conduit connecting port 13 (left to right as viewed in FIG. 1) via the conduits 12a and 13a. The annular valve seat 15 is positioned at the center of the metal diaphragm 16. The valve element 18 is engaged with and disengaged from the center of the metal diaphragm 16. If the valve element 18 is pressed against the annular valve seat 15 against the pressure of the fluid within the conduit 12a, the metal diaphragm 16 shuts off the connection between the conduit 12a and the conduit 13a.

The stop valve 10 is provided with a housing 21 that is composed of a lower housing 21a, and an upper housing 21b connected to the lower housing 21a via a lock ring 21c. A bottom end of the lower housing 21a is secured to the stop valve connecting port 14 via male and female screw threads that are respectively formed on the connecting port 14 and the lower housing 21a.

Figure 2:
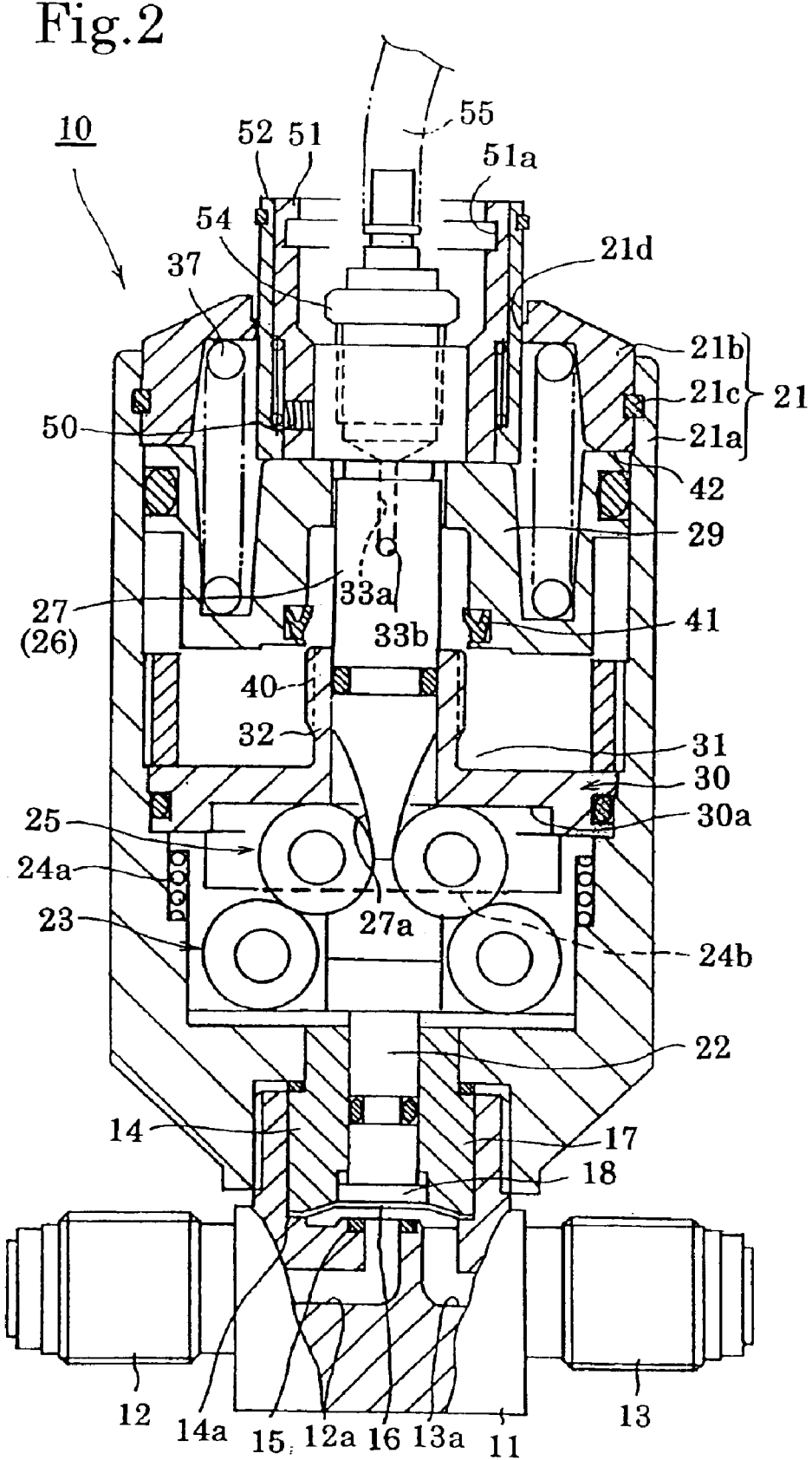
FIG. 2 is a longitudinal cross sectional view of the first embodiment of the normally-closed type of power-assisted slow operation valve shown in FIG. 1, showing a valve opened state thereof.

The stop valve 10 is provided in the housing 21 with a valve stem assembly 24 (see FIGS. 3 and 4), a pair of floating rollers (upper rollers) 25 and a working member 26 which are inserted into the housing 21 to be supported thereby as movable members, in that order from bottom to top as viewed in FIG. 1 or 2. The valve stem assembly 24 is provided with a valve rod 22 and a pair of rollers (lower rollers) 23. The valve rod 22 functions to make the valve element 18 move in a direction to be engaged with or disengaged from the annular valve seat 15. Each of the pair of rollers 23 is made up of a peripheral roller element 23a and an axial shaft 23b whose opposite ends are supported by a support block 22a of the valve stem assembly 24. The valve rod 22 is formed integral with the support block 22a. The pair of rollers 23 (the pair of axial shafts 23b) are arranged at opposite sides of the axis of the valve rod 22 in a symmetrical manner with respect to the axis of the valve rod 22 to extend parallel to each other in a direction perpendicular to the axis of the valve rod 22 without intersecting the axis of the valve rod 22.

The working member 26 is provided with a working rod 27 that is coaxial with the valve rod 22, and a piston body 29 that is secured to a middle portion of the working rod 27. The piston body 29 is slidably fitted in the housing 21 (the lower housing 21a) in an airtight fashion so that the outer peripheral surface of the piston body 29 slidably contacts an inner peripheral surface of the lower housing 21a, while the piston body 29 is slidalby fitted on a central cylindrical portion 32 of a stationary bearing member 30 so that the inner peripheral surface of the piston body 29 slidably contacts an outer peripheral surface of the central cylindrical portion 32. As shown in FIGS. 5 through 8, the working rod 27 is slidably fitted in the central cylinder 32 in an airtight fashion via an O-ring 32c. The O-ring 32c is fitted on the working rod 27 so that the outer edge thereof is in pressing contact with the inner peripheral surface 32b of the central cylindrical portion 32. The outer peripheral surface of the stationary bearing member 30 is fixed to an inner peripheral surface of the lower housing 21a in an airtight fashion. The housing 21, the piston body 29 (the working rod 27) and the stationary bearing member 30 together define a pressure chamber (a valve-opening pressure chamber) 31.

Figure 5:
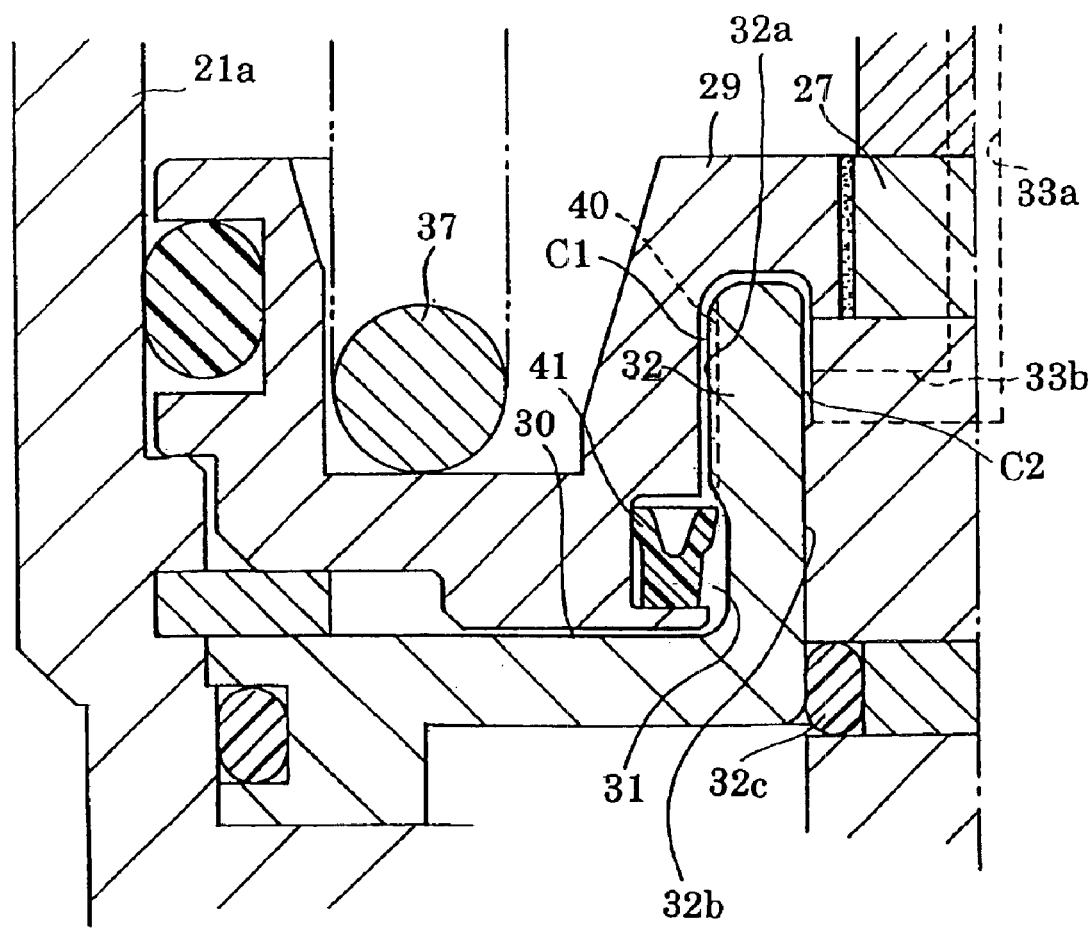
FIG. 5 is an enlarged sectional view of part of the normally-closed type of power-assisted slow operation valve shown in FIGS. 1 and 2, showing a state of a piston body, a stationary bearing member, and an annular sealing member when the valve is closed.
Figure 6:
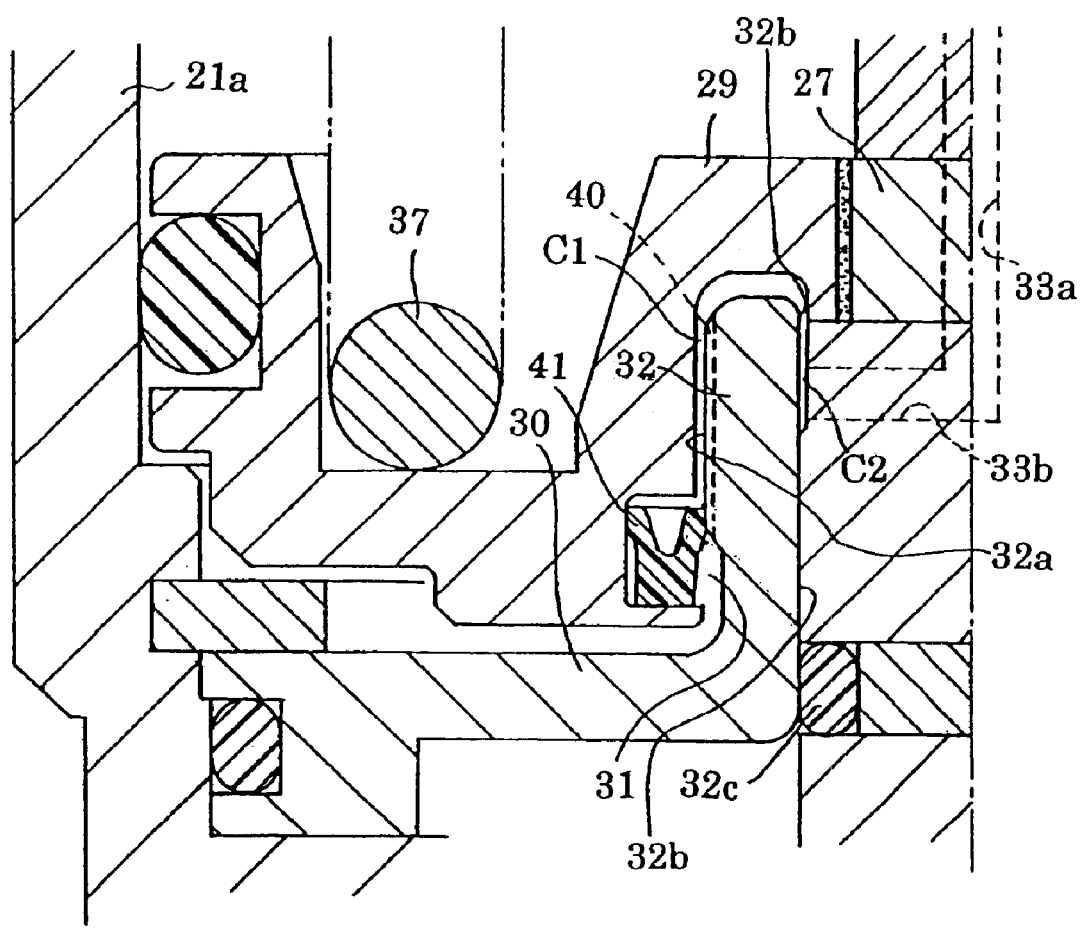
FIG. 6 is a view similar to that of FIG. 5 and illustrates a state of the piston body, the stationary bearing member, and the annular sealing member at the time of commencement of an operation of slowly opening the valve.

As shown in FIGS. 5 and 6, a gap C1 is formed between an outer peripheral surface 32a of the central cylindrical portion 32 and the piston body 29, while a gap C2 is formed between the inner peripheral surface 32b of the central cylindrical portion 32 and the working rod 27. The O-ring 32c prevents air from leaking from the pressure chamber 31 to a compartment in which the valve stem assembly 24 is positioned via the gap C2 to maintain hermeticity of the pressure chamber 31. A pilot pressure (compressed air/working fluid) P is applied to the pressure chamber 31 via an axial conduit (working fluid conduit/control conduit) 33a and a radial conduit (working fluid conduit/control conduit) 33b that are formed in the working rod 27.

Figure 3:
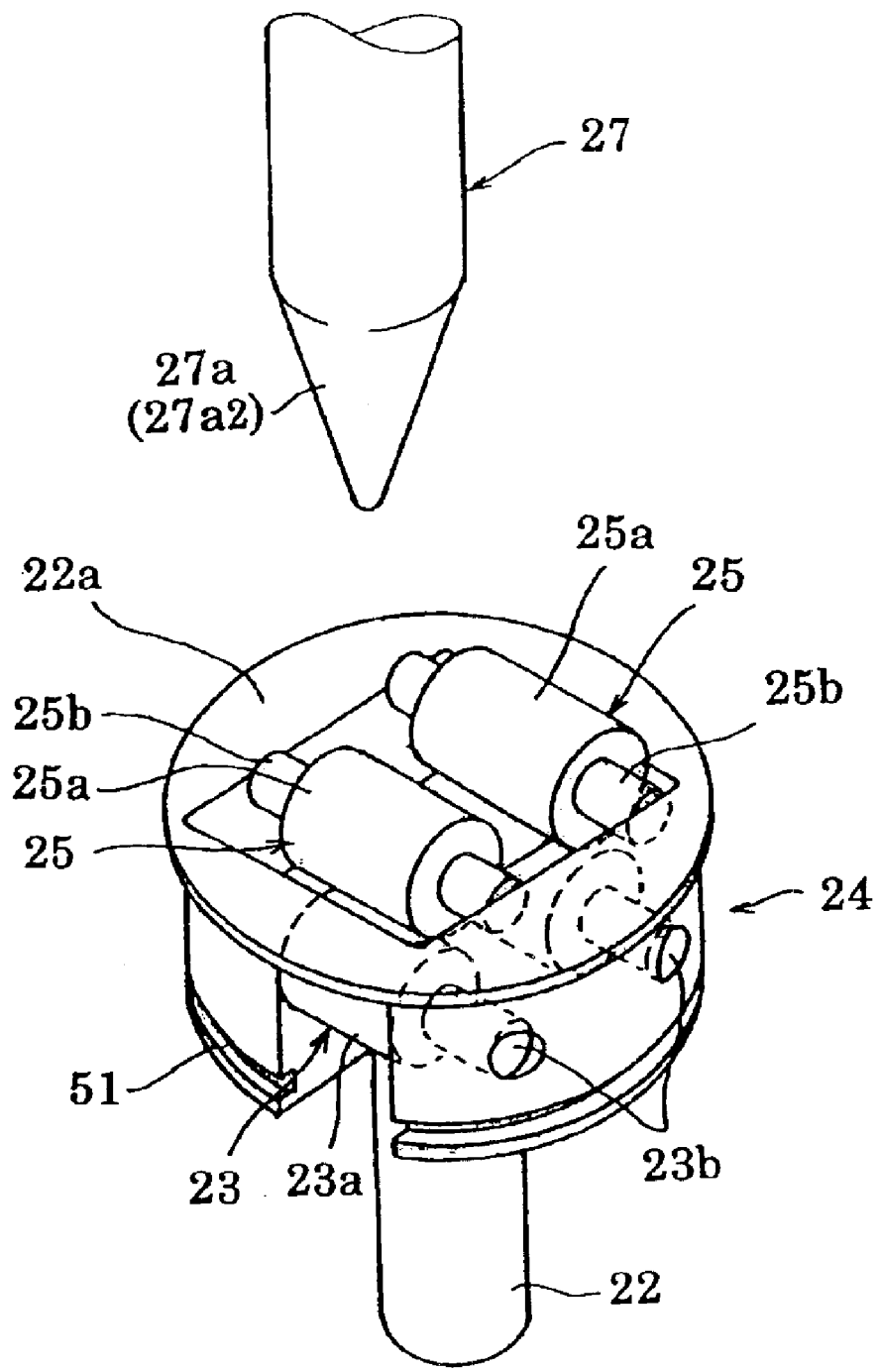
FIG. 3 is a perspective view of fundamental elements of the normally-closed type of power-assisted slow operation valve shown in FIGS. 1 and 2, showing the positional relationship between the tapered tip of a working rod, a pair of floating rollers, and a pair of rollers.
Figure 4:
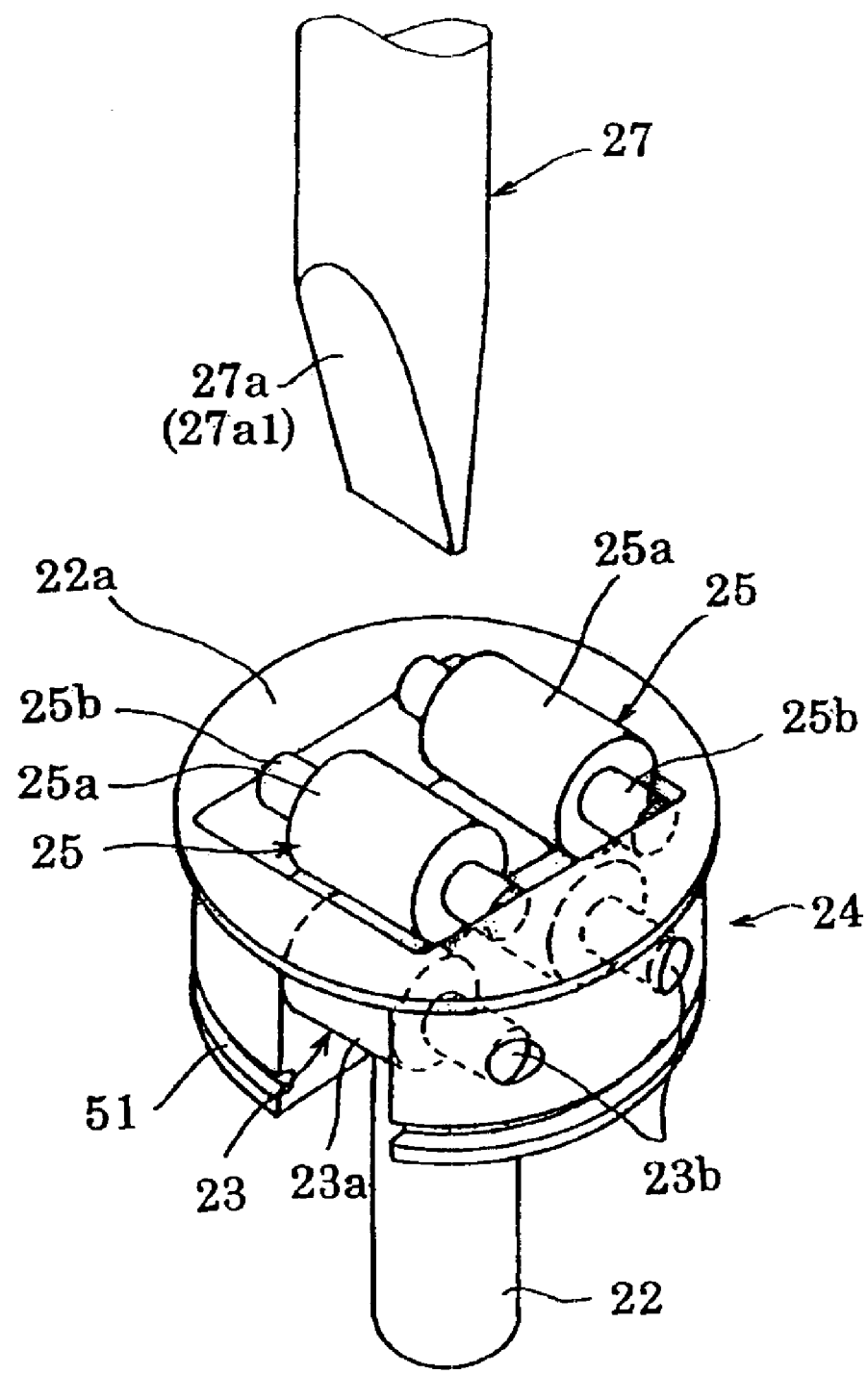
FIG. 4 is a view similar to that of FIG. 3 and illustrates fundamental elements of the normally-closed type of power-assisted slow operation valve shown in FIGS. 1 and 2, showing another embodiment of the tapered tip of the working rod which has a different shape from that of the tapered tip shown in FIG. 3.

The stop valve 10 is provided between the piston body 29 and the upper housing 21b with a compression spring (biasing member) 37 that normally biases the working member 26 toward the valve stem assembly 24. The lower end of the working rod 27 of the working member 26 is formed as a tapered tip 27a. The pair of floating rollers 25 are disposed between the tapered tip 27a of the working rod 27 and the pair of rollers 23. The tapered tip 27a can be formed as a tip 27a2 in the shape of a circular cone as shown in FIG. 3, or a tip 27a1 in the shape of a wedge having two flat surfaces as shown in FIG. 4.

Each of the pair of floating rollers 25 is made up of a peripheral roller element 25a and an axial shaft 25b. Each peripheral roller element 25a is accommodated in a recess 30a formed on a bottom surface of the stationary bearing member 30 so as not to move in the axial direction of the working rod 27, while each axial shaft 25b is guided by a guiding surface 24b of the valve stem assembly 24 to be movable in a direction perpendicular to the axis of the valve rod 22. The pair of floating rollers 25 are provided parallel to the pair of rollers 23 between the tapered tip 27a and the pair of rollers 23. Valve-closing pressure which is exerted on the working member 26 is transmitted to the valve rod 22 via the tapered tip 27a of the working rod 27, the pair of floating rollers 25 and the pair of rollers 23.

The shape of the tapered tip 27a of the working rod 27, the outer diameter of each of the upper and lower pairs of rollers 23 and 25, and the initial position of each of the upper and lower pairs rollers 23 and 25 (at the time the valve element 18 is disengaged from the annular valve seat 15) are determined in a manner so that the valve rod 22 moves by an amount of movement smaller than the amount of movement of the working member 26 when the working member 26 moves toward the valve stem assembly 24 to cause the valve rod 22 to move toward the annular valve seat 15 via the tapered tip 27a, the pair of floating rollers 25 and the pair of rollers 23. For instance, a ratio of the amount of movement of the working member 26 to the amount of movement of the valve rod 22 can be "1:0.2" or "1:0.1". The tapered tip 27a remains in contact with the pair of floating rollers 25, which in turn remain in contact with the pair of rollers 23 at all times in any operational state. Even if the working member 26 moves to a closest position with respect to the valve stem assembly 24, the positions of the pair of floating rollers 25 never move outward beyond the positions of the pair of rollers 23 in a direction perpendicular to the axial direction of the working rod 27 (in the horizontal direction as viewed in FIG. 1 or 2). The stop valve 10 is provided between the valve stem assembly 24 and the lower housing 21a with a compression spring 24a that has a relatively small spring force which biases the valve stem assembly 24 in a direction to open the valve.

Figure 7:
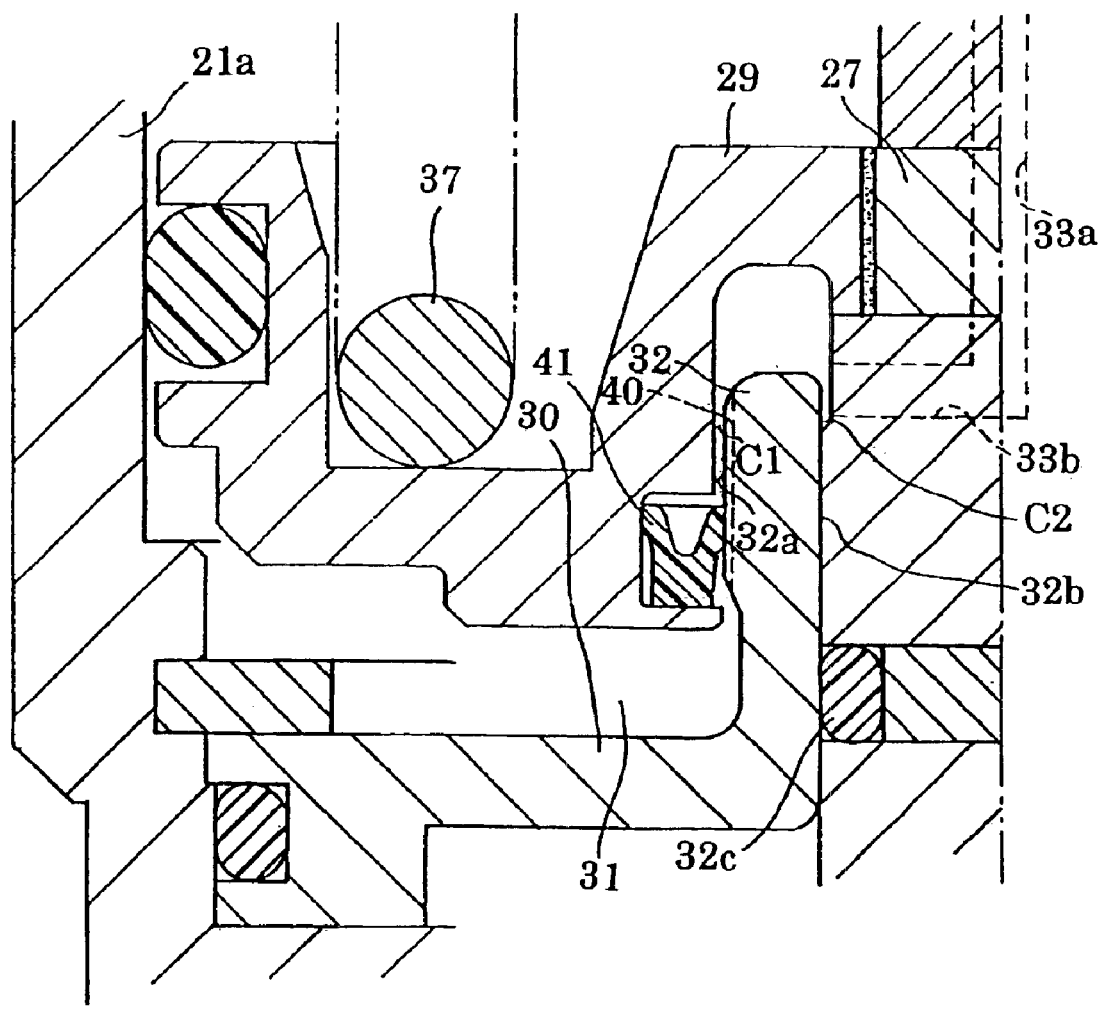
FIG. 7 is a view similar to that of FIG. 5 and illustrates a state of the piston body, the stationary bearing member, and the annular sealing member during the operation of slowly opening the valve.

The compressed air (working fluid) which flows out of the radial conduit 33b is led to the pressure chamber 31 via the gap C2 and the gap C1. The central cylindrical portion 32, which is an element that defines the gap C1, is provided with at least one slit 40 which is connected with the gap C1 and which extends linearly in the axial direction of the central cylindrical portion 32, or alternatively extends in a helical fashion about the axis of the central cylindrical portion 32. An annular sealing member (one-way sealing member) 41 is fitted in an annular groove formed on an inner peripheral surface of the piston body 29 so as to face the gap C1. The annular sealing member 41 obstructs the gap C1 so that the radial conduit 33b and the pressure chamber 31 are connected with each other only via the slit 40 when the annular sealing member 41 contacts the outer peripheral surface 32a of the central cylindrical portion 32 as shown in FIGS. 6 and 7. However, in a state shown in FIG. 5 where the piston body 29 is positioned at the lower limit of the movable range thereof due to the spring force of the compression spring 37, the annular sealing member 41 is disengaged from the outer peripheral surface 32a of the central cylindrical portion 32 to retreat from the gap C1 at the lower end thereof. Consequently, the radial conduit 33b and the pressure chamber 31 are connected with each other via the gap C1 and the slit 40. Accordingly, the cross-sectional area of the passage which connects the radial conduit 33b with the pressure chamber 31 in a state shown in FIG. 5 is obviously greater than that in a state shown in FIG. 6.

The above-described structure of the stop valve 10 is identical to that of the embodiment of the valve described in Japanese Unexamined Patent Publication No. 11-82804. In addition to this structure, the present embodiment of the stop valve 10 is further provided with an apparatus for visually checking the operational status of the stop valve 10. This apparatus will be discussed in detail with reference to FIGS. 1 and 2.

The stop valve 10 is provided, at one end (the upper end) of the working rod 27 that is opposite to the other end thereof with respect to the retainer 17, with a cylindrical holder (a connecting sleeve) 51 that is fixed to the working member 26 at the upper end of the working rod 27 via a set screw 50. The cylindrical holder 51 is coaxial with the working rod 27. The stop valve 10 is provided around the cylindrical holder 51 with a cylindrical visual checking member 52 that is fixedly fitted on the cylindrical holder 51. The upper housing 21b is provided with an opening 21d in which the visual checking member 52 is fitted in a slidable manner. The visual checking member 52 fully retracts into the opening 21d when the working rod 27 is in the valve-close position thereof (see FIGS. 1 and 10A), while the visual checking member 52 projects from the opening 21d when the working rod 27 is in the valve-open position thereof (see FIGS. 2 and 10B). The visual checking member 52 and the working rod 27 are positioned coaxially. The visual checking member 52 can be made of, for example, synthetic resin or metal, and can be colored in a conspicuous color such as red.

A line joint (conduit fitting) 54 is coupled to the working rod 27 to be positioned in the cylindrical holder 51 so as to be connected with the axial conduit 33a. One end of a flexible tube (external tube) 55 (shown by two-dot chain lines in FIGS. 1 and 2) is connected to the line joint 54 to be connected to the working rod 27 via the line joint 54. The other end of the flexible tube 55 is connected to an open/close control valve 56, a regulator 57, and an air pilot pressure source (pressure supplying device) 58, in this order.

The housing 21, the piston body 29, the stationary bearing member 30, the pressure chamber 31, the line joint 54, the flexible tube 55, the open/close control valve 56, the regulator 57, and the air pilot pressure source 58 together constitute a power-assisted device for the stop valve 10.

The operation of the first embodiment of the power-assisted slow operation stop valve 10 will be hereinafter discussed. In a state where no compressed air is introduced to the pressure chamber 31, the working member 26 moves into the valve stem assembly 24 by the spring force of the compression spring 37. This moving force (valve-closing force) is transmitted to the valve rod 22 via the tapered tip 27a of the working rod 27, the pair of floating rollers 25, and the pair of rollers 23, so that the valve rod 22 makes the valve element 18 move toward the annular valve seat 15 to thereby shut off the connection between the conduit 12a and the conduit 13a via the metal diaphragm 16, as shown in FIG. 1.

At this stage, the annular sealing member 41, which is held by the piston body 29, is disengaged from the outer peripheral surface 32a of the central cylindrical portion 32 to retreat from the slit 40 at the lower end of the gap C1 to open the lower portion of the gap C1. Therefore, the pilot pressure source 58 (the radial conduit 33b) and the pressure chamber 31 are connected with each other via a passage having a wide cross-sectional area which includes the gap C1 and the slit 40.

In this state, opening the open/close control valve 56 to introduce compressed air generated by the pilot pressure source 58 to the radial conduit 33b of the working rod 27 via the axial conduit 33a causes the compressed air to be led to the pressure chamber 31 via the gap C1 and the slit 40 between the central cylindrical portion 32 and the piston body 29. Therefore, compressed air flows into the pressure chamber 31 by an amount determined by the total cross-sectional area of the gap C1 and the slit 40 to thereby instantly full the pressure chamber 31 with sufficient pressure so as to resist the compression spring 37. Consequently, the piston body 29 (the working rod 27) slightly moves, and at the same time the valve rod 22 slightly moves by an amount corresponding to one tenth (in the case of the aforementioned ratio being 1:0.1) or one fifth (in the case of the aforementioned ratio being 1:0.2) of the amount of movement of the piston body 29 in this particular embodiment. As a result, the valve element 18 slightly lifts off the annular valve seat 15 to start opening the stop valve 10. The dead time until the moment the valve opens corresponds to a section "a" shown in FIG. 9. The dead time shown in section "a" can be shortened.

At the time the stop valve 10 starts opening, the annular sealing member 41 of the piston body 29 comes into contact with the outer peripheral surface 32a of the central cylindrical portion 32 (the stationary bearing member 30) to close the gap C1 (see FIG. 6), so that the radial conduit 33b and the pressure chamber 31 are communicated with each other via only the slit 40. Therefore, the cross-sectional area of the passage which connects the radial conduit 33b with the pressure chamber 31 suddenly decreases. This state lasts as long as the sealing member 41 remains in contact with the outer peripheral surface 32a of the central cylindrical portion 32 (see FIG. 7). Accordingly, the quantity of compressed air introduced to the pressure chamber 31 per unit of time is restricted, while the piston body 29 (the working rod 27 and the valve rod 22) moves upward at a slow speed (a section "b" shown in FIG. 9). The upward movement of the working rod 27 in this section "b" corresponds to an operation of slowly opening the valve.

Figure 8:
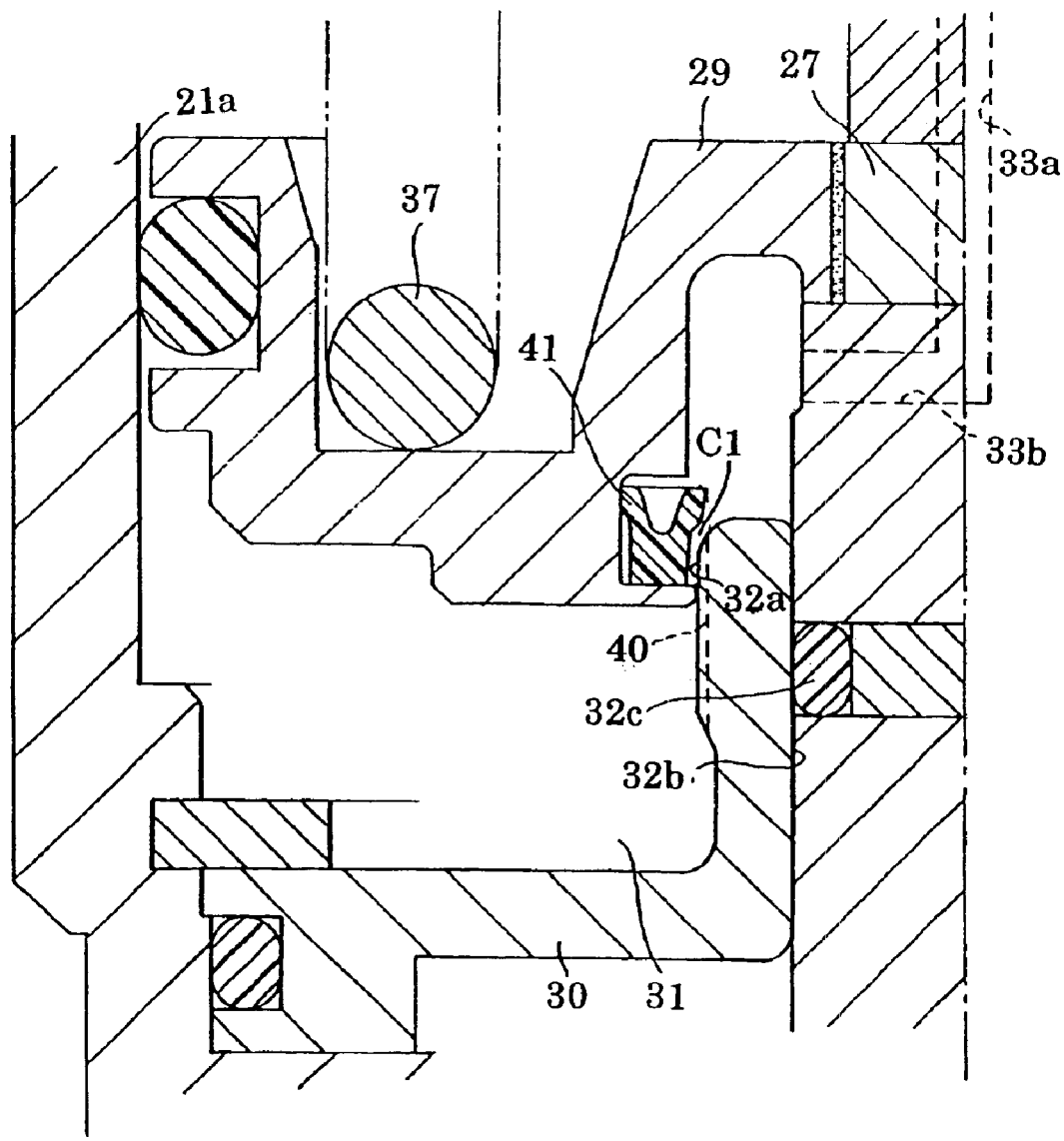
FIG. 8 is a view similar to that of FIG. 5 and illustrates a state of the piston body, the stationary bearing member and the annular sealing member when the operation of slowly opening the valve ends.

Further upward movement of the piston body 29 causes the sealing member 41 to release contact with the outer peripheral surface 32a of the central cylindrical portion 32 (see FIGS. 2 and 8). In this state shown in FIGS. 2 and 8, the pilot pressure source 58 (the radial conduit 33b) and the pressure chamber 31 are directly connected with each other, so that the working rod 27 (the valve rod 22) reaches the valve-open limit thereof rapidly. The valve-open limit of the working rod 27 is defined by the position of the piston body 29 where it contacts a stop surface 42 (see FIGS. 1 and 2) of the housing 21. This stage of movement of the valve corresponds to a stage "c" shown in FIG. 9.

Figure 9:
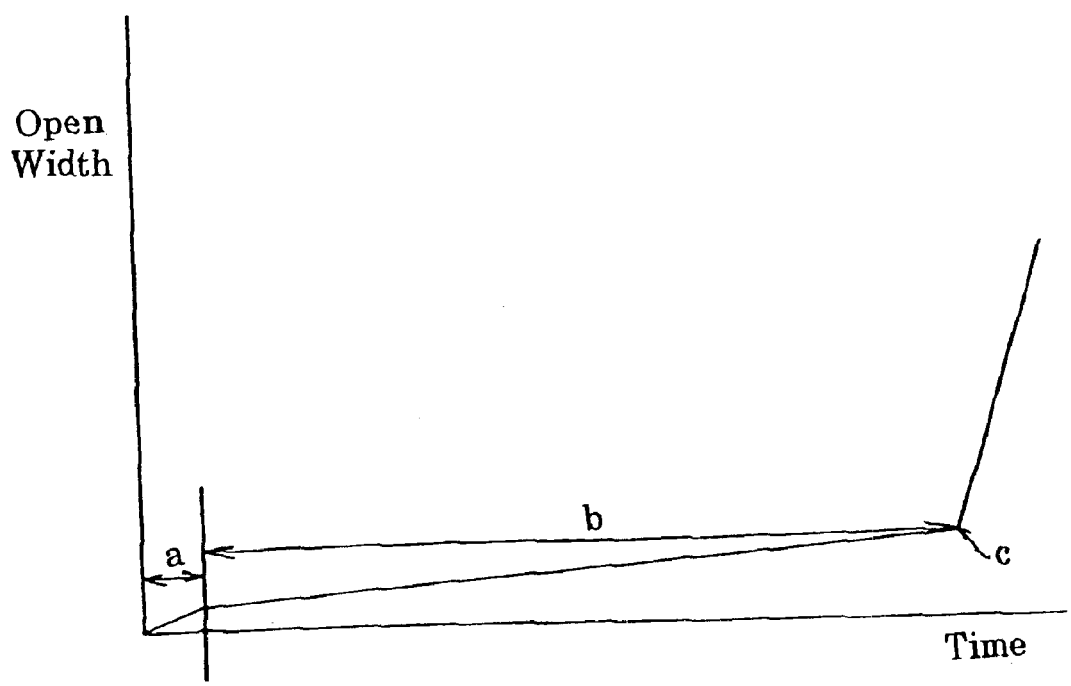
FIG. 9 is a graph showing an example of the valve-opening characteristic of the normally-closed type of power-assisted slow operation valve shown in FIGS. 1 and 2.

As can be understood from the above-described series of operations of opening the valve, the piston body 29 (the valve rod 22) starts moving with a small amount of dead time (the section "a" shown in FIG. 9) in an early stage of opening the valve in which compressed air is introduced into the pressure chamber 31 (i.e., when a valve-open signal is applied), subsequently an operation of slowly opening the valve occurs (the section "b" shown in FIG. 9) once the valve starts opening, and finally an operation of rapidly opening the valve is achieved when the piston body 29 reaches a predetermined position (the section "c" shown in FIG. 9). If the last operation of rapidly opening the valve (the section "c" shown in FIG. 9) is unnecessary, the associated elements only need to be designed and arranged so that the annular sealing member 41 keeps contact with the outer peripheral surface 32a of the central cylindrical portion 32 until the end of the stroke of the piston body 29. The speed of the operation of slowly opening the valve (the section "b" shown in FIG. 9) can be determined by the cross-sectional area of the slit 40 (a sum of the cross-sectional areas of all the slits 40 in the case where more than one slit 40 is formed on the central cylindrical portion 32).

If the pilot pressure is discharged out of the pressure chamber 31, the spring force of the compression spring 37 causes the valve rod 22 to press the valve element 18 against the annular valve seat 15 to close the valve. At this stage, the valve closes quickly since the annular sealing member 41 serves as a one-way sealing member. In regard to the force transmission path at this stage, a large valve-closing force can be obtained with a small compression spring 37 when the valve-closing force of the working member 26 is transmitted to the valve rod 22 via the tapered tip 27a of the working rod 27, the pair of floating rollers 25, and the pair of rollers 23, since the valve rod 22 moves only by an amount of movement smaller than the amount of movement of the working member 26. In the present embodiment, a valve-closing force which is five or ten times of the spring force of the compression spring 37 can be obtained.

Figure 10A:
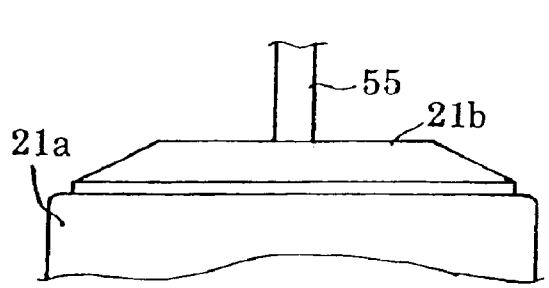
FIG. 10A is a front view of fundamental portion of the valve-opening characteristic of the normally-closed type of power-assisted slow operation valve shown in FIGS. 1 and 2, showing a state where a cylindrical visual checking member retreats from an upper housing when the valve is closed.
Figure 10B:
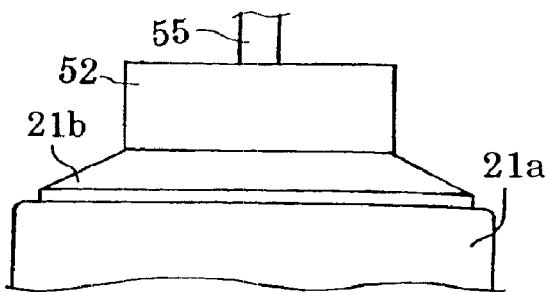
FIG. 10B is a view similar to that of FIG. 10A and shows a state where the cylindrical visual checking member projects into the upper housing when the valve is open.

According to the present embodiment, in a valve closed state wherein the wording rod 27 is positioned at the limit of the moving range thereof due to the spring force of the compression spring 37, the cylindrical visual checking member 52, which is integral with the working rod 27, retreats into the opening 21d to be hidden within the housing 21 (see FIGS. 1 and 10A). Thereafter, when the working rod 27 moves to the valve-open position thereof (the valve-fully-open position) due to the pilot pressure, the cylindrical visual checking member 52 projects out of the opening 21d (see FIGS. 2 and 10B). When the working rod 27 is positioned in an intermediate valve-open position between the valve-fully-open position and the valve-close position, the amount of projection of the cylindrical visual checking member 52 from the housing 21 varies in accordance with the amount of opening of the valve. When the working rod 27 (the cylindrical visual checking member 52) moves, the line joint 54 and the flexible tube 55 also move together with working rod 27, and accordingly, the operational status of the stop valve 10 can be visually checked at a glance.

Figure 12:
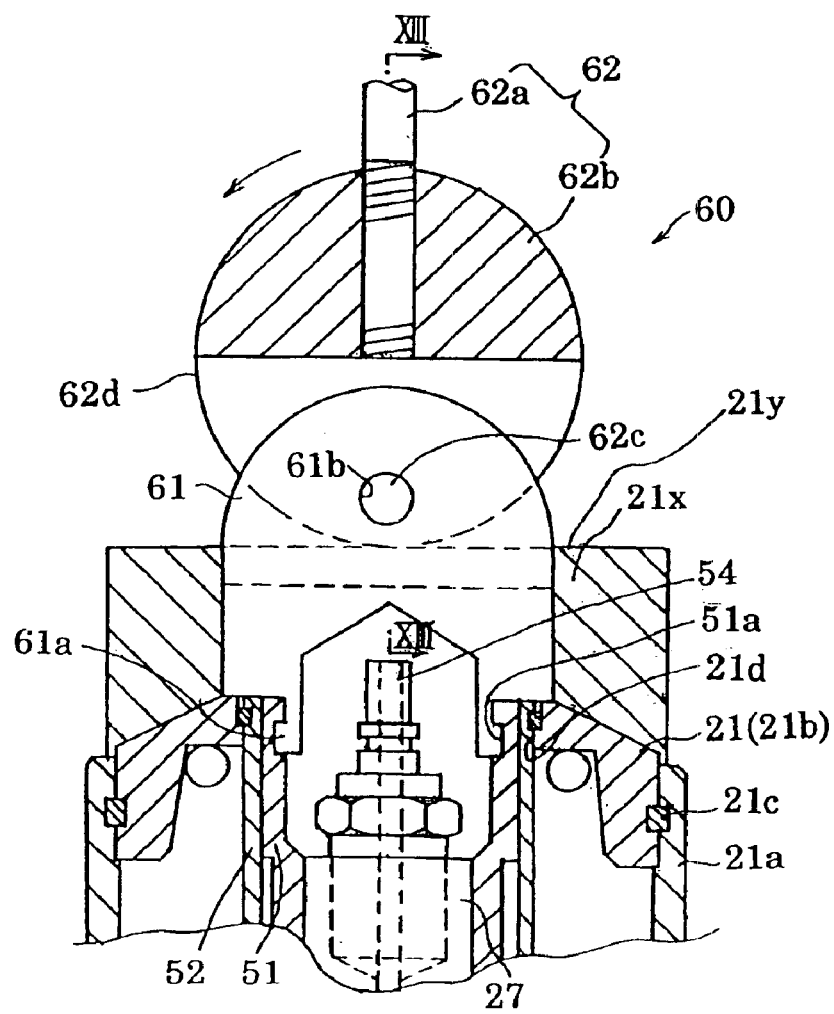
FIG. 12 is a cross sectional view of the hand-operated valve opening jig shown in FIG. 11 and the associated member of the power-assisted slow operation valve shown in FIG. 11, showing a state where the hand-operated valve opening jig is engaged with the associated member but has not yet been operated to open the valve.
Figure 11:
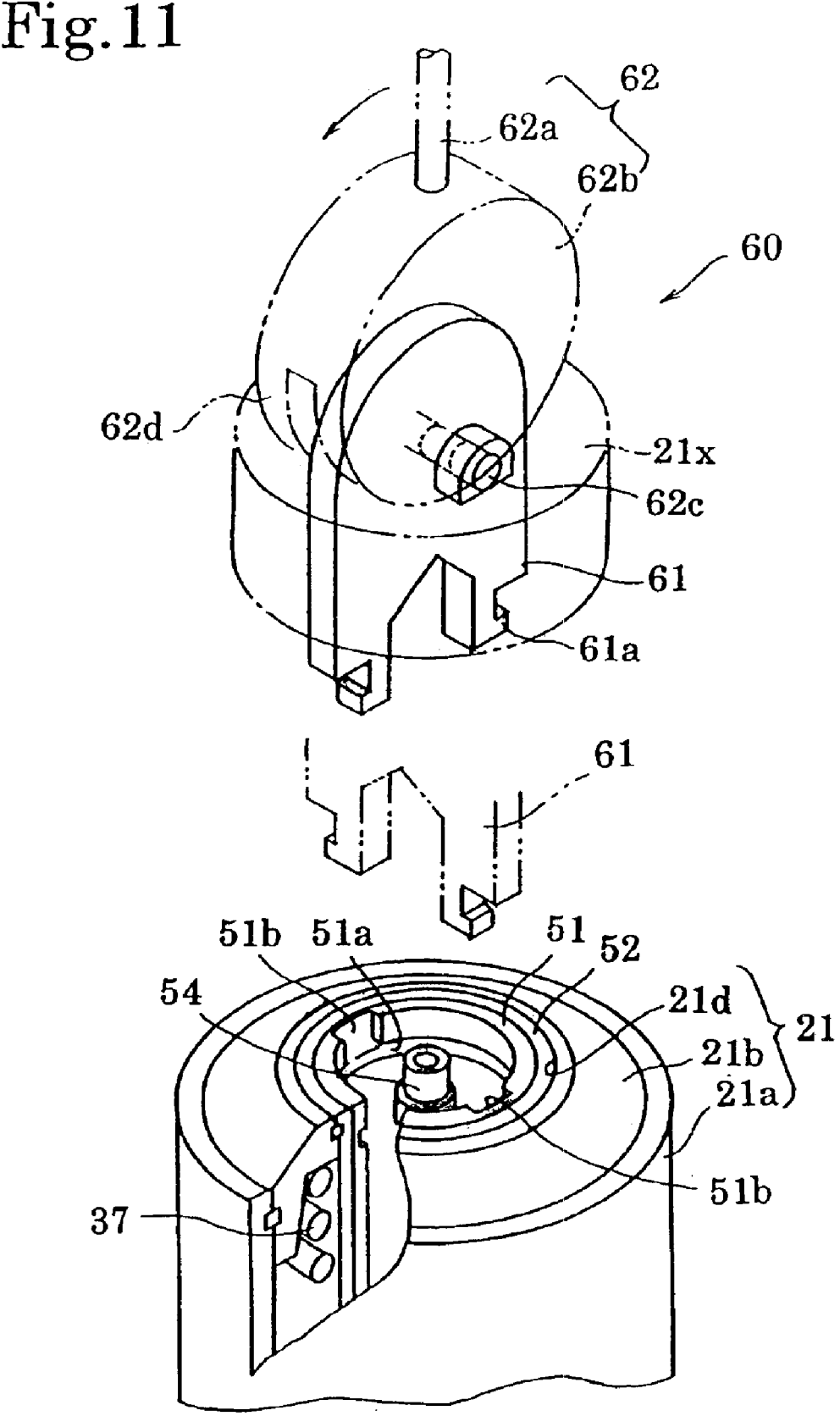
FIG. 11 is a perspective view of a hand-operated valve opening jig for the first embodiment of the normally-closed type of power-assisted slow operation valve shown in FIGS. 1 and 2, and an associated member of the power-assisted slow operation valve to which the hand-operated valve opening jig is engaged.
Figure 13:
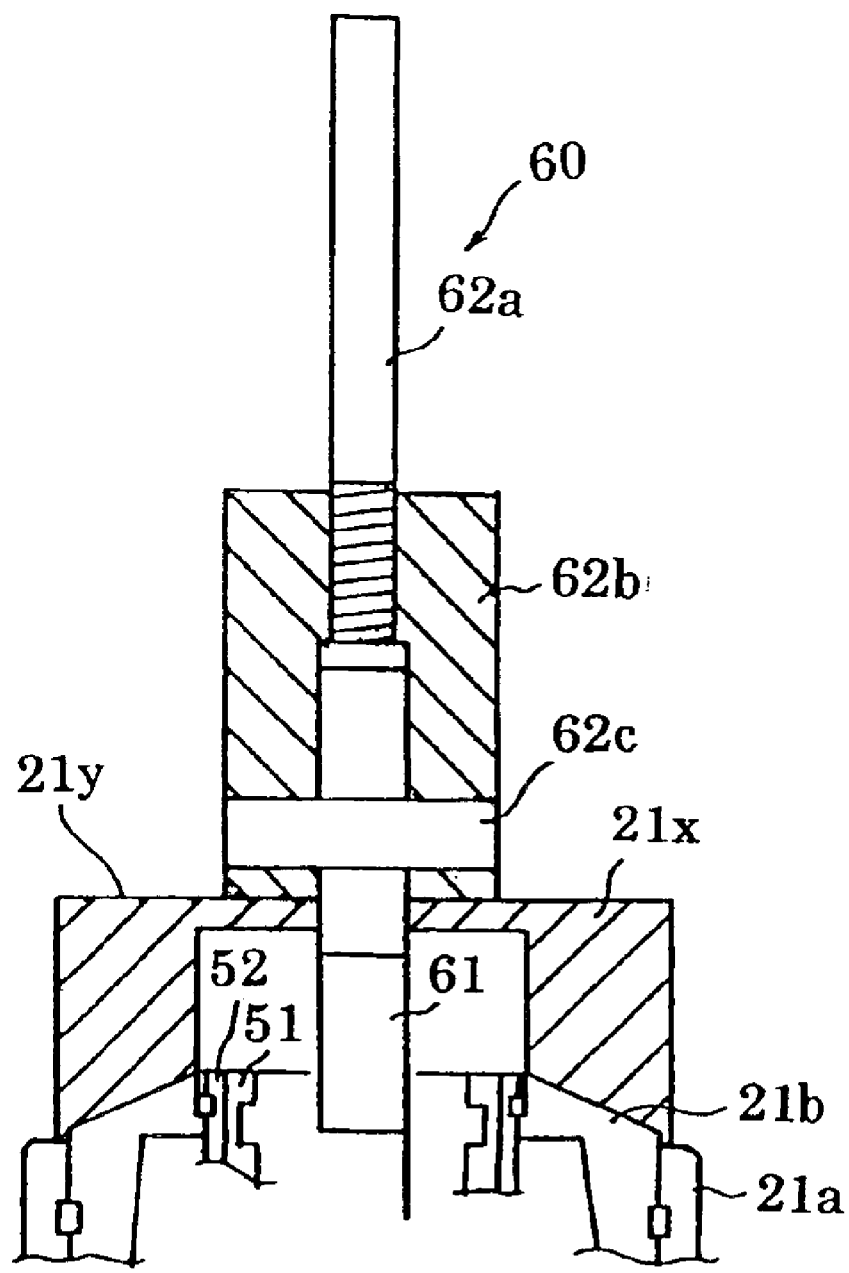
FIG. 13 is a cross sectional view of the hand-operated valve opening jig shown in FIG. 12 and the associated member of the power-assisted slow operation valve, taken along the XIII—XIII line shown in FIG. 12, as viewed in the direction of the appended arrows.
Figure 14:
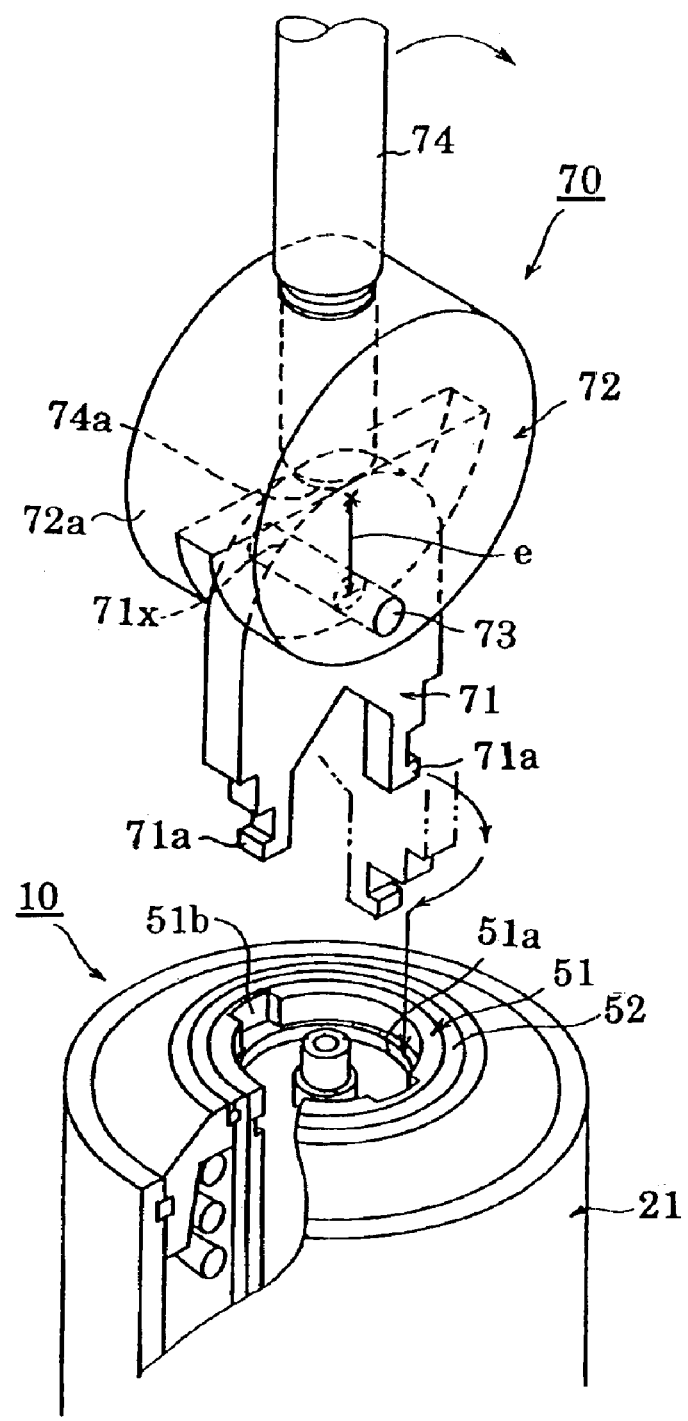
FIG. 14 is a perspective view of a hand-operated valve opening jig for the second embodiment of the normally-closed type of power-assisted slow operation valve to which the present invention is applied, and an associated member of the power-assisted slow operation valve to which the hand-operated valve opening jig is engaged.
Figure 15:
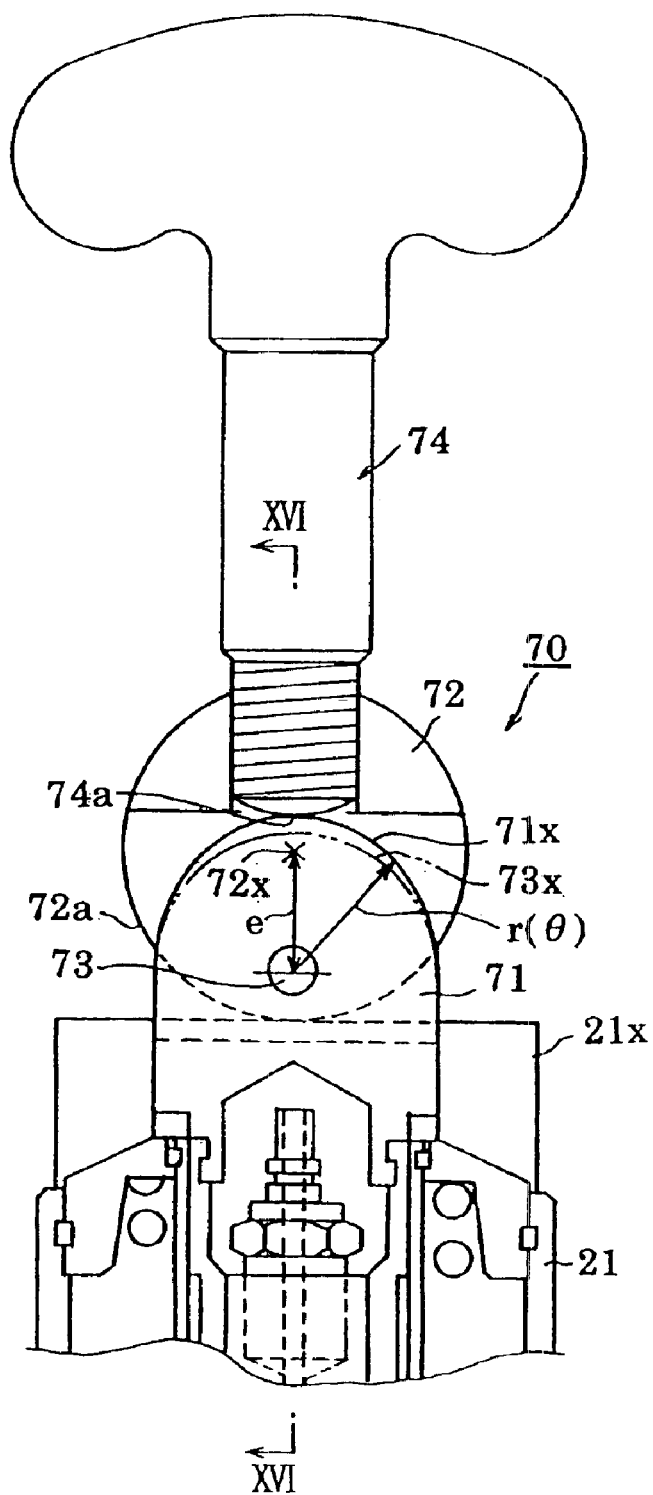
FIG. 15 is a cross sectional view of the hand-operated valve opening jig shown in FIG. 14 and the associated member of the power-assisted slow operation valve shown in FIG. 14, showing a state where the hand-operated valve opening jig is engaged with the associated member but has not yet been operated to open the valve.
Figure 16:
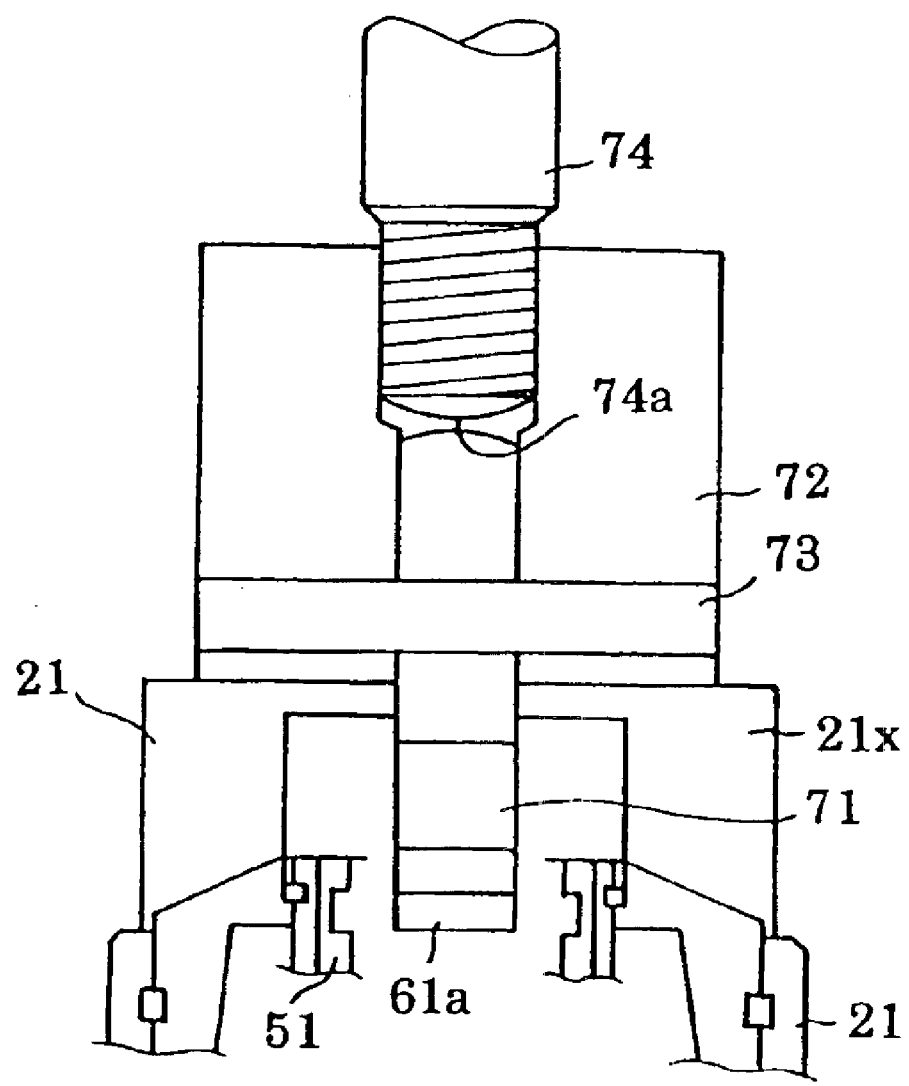
FIG. 16 is a cross sectional view of the hand-operated valve opening jig shown in FIG. 14 and the associated member of the power-assisted slow operation valve shown in FIG. 14, taken along the XVI—XVI line shown in FIG. 15, looking in the direction of the appended arrows.

The present embodiment of the stop valve 10 is further provided with a manual valve opening device. The manual valve opening device is used to open the valve manually when a sufficient pilot pressure cannot be generated due to, e.g., a breakdown in the pilot pressure source 58. As shown in FIGS. 1 and 2, the cylindrical holder 51 is provided on an inner peripheral surface thereof with an annular groove 51a. As shown in FIGS. 11 and 12, the cylindrical holder 51 is further provided on the inner peripheral surface thereof immediately above the annular groove 51a with a pair of radial grooves 51b which are positioned diametrically to face each other and connect with the annular groove 51a.

A hand-operated valve opening jig 60 shown in FIGS. 11 though 13 is used when the stop valve 10 of the first embodiment is opened manually. The valve opening jig 60 is provided with a manual-opening attachment 61 which can be detachably attached to the annular groove 51a of the cylindrical holder 51 via the pair of radial grooves 51b. The valve opening jig 60 is further provided with an operational member 62 that is operated to move the working rod 27 in a direction to open the valve via the manual-opening attachment 61. The manual-opening attachment 61 is provided with a pair of hooks 61a which can be respectively inserted into the annular grooves 51a via the pair of radial grooves 51b. If the manual-opening attachment 61 is rotated relative the housing 21 after the pair of hooks 61a are inserted into the annular grooves 51a via the pair of radial grooves 51b, the pair of hooks 61a slide into the annular groove 51a to be engaged therein, so that the pair of hooks 61a do not come off the annular groove 51a if the valve opening jig 60 is pulled up. On the other hand, the operational member 62 is provided with an operational lever 62a and a disk (rotational member) 62b. The operational lever 62a extends radially from the disk 62b. An operational mount 21x, which is provided as a member separate from the valve opening jig 60 and the housing 21, is mounted on the housing 21 around the circumference of the opening 21d (i.e., is not mounted on the upper housing 21b so as to interfere with the visual checking member 52) when the valve opening jig 60 is used. The manual-opening attachment 61 and the operational member 62 are connected to each other via a connection pin (pivot) 62c which is inserted into the manual-opening attachment 61 via holes 61b, so that the operational member 62 can pivot about the center of the connection pin 62c with respect to the manual-opening attachment 61. The connection pin 62c is provided at an off-centered position on the disk 62b. An outer edge (cylindrical surface) 62d of the disk 62b contacts an upper surface 21y of the operational mount 21x (see FIG. 13).

When the stop valve 10 is manually opened with the hand-operated valve opening jig 60, firstly the flexible tube 55 is disconnected from the line joint 54, secondly the pair of hooks 61a of the manual-opening attachment 61 are inserted into the annular groove 51a via the pair of radial grooves 51b, and thirdly the manual-opening attachment 61 is rotated relative the housing 21 to bring the pair of hooks 61a into engagement with the annular groove 51a. At this stage, the connection pin 62c is positioned closest to the operational mount 21x, while the operational mount 21x is in contact with the head of the housing 21 (see FIG. 12). In the state shown in FIG. 12, rotating the disk 62b by manually moving the operational lever 62a causes the manual-opening attachment 61 to be raised via the connection pin 62c, the outer edge 62d and the upper surface 21y of the operational mount 21x. This causes the pair of hooks 61a of the manual-opening attachment 61 to lift the cylindrical holder 51 via the annular groove 51a, which in turn lifts-the working rod 27 (since the cylindrical holder 51 is fixed to the upper end of the working rod 27 via a set screw 50) against the spring force of the compression spring 37 to thereby open the valve.

In the above-described first embodiment of the power-assisted slow operation valve (stop valve) 10, although the cylindrical holder 51 is fixed to the working rod 27 via the set screw 50 while the cylindrical visual checking member 52 is fixed to an outer peripheral surface of the cylindrical holder 51, the working rod 27 and the cylindrical holder 51 can be formed integral with each other as a single member.

The second embodiment of the present invention is applied will be hereinafter discussed with reference to FIGS. 14 through 18. Parts or elements which are identical to those in the above-described first embodiment are designated by the same reference numerals, and accordingly will not be hereinafter described in detail.

The second embodiment of the present invention is different from the first embodiment in that the hand-operated valve opening jig 70 has a different structure from the hand-operated valve opening jig 60 of the first embodiment.

The hand-operated valve opening jig 70 is provided with a manual-opening attachment 71 which can be detachably attached to the annular groove 51a of the cylindrical holder 51 via the pair of radial grooves 51b. The valve opening jig 70 is further provided with a rotational member 72 that is operated to move the working rod 27 in a direction to open the valve via the manual-opening attachment 71. An operational mount 21x, which is provided as a member separate from each of the valve opening jig 70 and the housing 21, is mounted on the housing 21 around the circumference of the opening 21d (i.e., is not mounted on the upper housing 21b so as to interfere with the visual checking member 52) when the valve opening jig 70 is used. The valve opening jig 70 has access to the cylindrical holder 51 from the outside of the housing 21 via the operational mount 21x and the opening 21d of the upper housing 21b.

The manual-opening attachment 71 is provided with a pair of hooks 71a which can be respectively inserted into the annular grooves 51a via the pair of radial grooves 51b. If the manual-opening attachment 71 is rotated relative the housing 21 after the pair of hooks 71a are inserted into the annular grooves 51a via the pair of radial grooves 51b, the pair of hooks 71a slide into the annular groove 51a to be engaged therewith, so that the pair of hooks 71a do not come off the annular groove 51a if the valve opening jig 70 is pulled up.

The rotational member 72 is provided along an outer edge thereof with a cylindrical surface 72a that comes in contact with an upper surface of the operational mount 21x mounted on the housing 21 (the upper housing 21b) of the stop valve 10. The manual-opening attachment 71 and the rotational member 72 are connected to each other via a connection pin (pivot) 73 at an off-centered position thereof from the axial center 72x of the cylindrical surface 72a (i.e., at a position decentered from the axial center 72x of the cylindrical surface 72a toward the cylindrical holder 51 by a distance "e" shown in FIGS. 14 and 15) so that the rotational member 72 can pivot about the center of the connection pin 72 with respect to the manual-opening attachment 71. The manual-opening attachment 71 is provided on top thereof with a curved stopper surface 71x which bulges upward slightly from an imaginary cylindrical surface 73x about the center of the connection pin 73 that is indicated by a two-dot chain line in FIG. 15. The cylindrical surface 72a does not have to be an exact cylindrical surface.

A locking shaft (operational member) 74 having a male screw at a tip end 74a thereof is screwed into the rotational member 72 toward an approximate center of the cylindrical surface 72a. The tip end 74a of the locking shaft 74 is engaged with and disengaged from the curved stopper surface 71x of the manual-opening attachment 71 by manually rotating the locking shaft 74 clockwise and counterclockwise, respectively. The curved stopper surface 71x is formed so that the distance r (θ) between the center of the connection pin 73 and the curved stopper surface 71x becomes maximum when measured from the center of the connection pin 73 to a position on the curved stopper surface 71x directly above the connection pin 73 and so that the distance r (θ) reduces gradually and smoothly as the position on the curved stopper surface 71x moves down toward either side of the curved stopper surface 71x. Namely, the curved stopper surface 71x is formed so that the distance between the curved stopper surface 71x and the tip end 74a of the locking shaft 74 increases as the cylindrical holder 51 is moved in a direction to open the valve via the manual-opening attachment 71 and the connection pin 73 when the rotational member 72 is rotated with the cylindrical surface 72a thereof remaining in contact with the upper surface of the operational mount 21x. The tip end 74a of the locking shaft 74 moves on an imaginary cylindrical surface (not shown) which extends parallel to the imaginary cylindrical surface 73x when the rotational member 72 rotates.

When the stop valve 10 is manually opened with the hand-operated valve opening jig 70, firstly the flexible tube 55 is disconnected from the line joint 54, secondly the pair of hooks 71a of the manual-opening attachment 71 are inserted into the annular groove 51a via the pair of radial grooves 51b, and thirdly the manual-opening attachment 71 is rotated relative the housing 21 to bring the pair of hooks 71a into engagement with the annular groove 51a. At this stage, the connection pin 73 is positioned closest to the operational mount 21x, while the cylindrical surface 72a of the rotational member 72 contacts the operational mount 21x mounted on the head of the housing 21 (see FIGS. 15 and 16). In the state shown in FIGS. 15 and 16, rotating the rotational member 72 by manually moving the locking shaft 74 causes the manual-opening attachment 71 to be raised via the connection pin 73 that is eccentric to the axial center of the rotational member 72. This causes the pair of hooks 71a of the manual-opening attachment 71 to lift the cylindrical holder 51 via the annular groove 51a, which in turn lifts the working rod 27 against the spring force of the compression spring 37 to thereby open the valve (see FIGS. 17 and 18).

Figure 17:
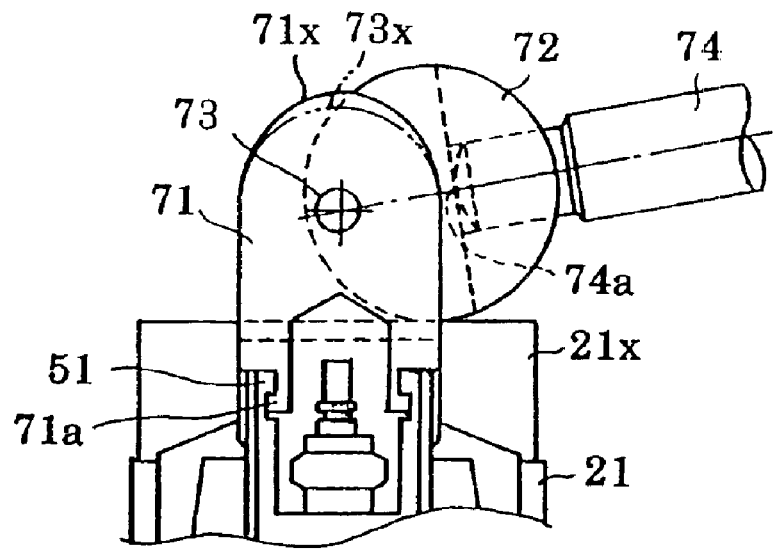
FIG. 17 is a cross sectional view of the hand-operated valve opening jig shown in FIG. 14 and the associated member of the power-assisted slow operation valve shown in FIG. 14, showing a state where the hand-operated valve opening jig is engaged with the associated member and has been operated to open the valve.
Figure 18:
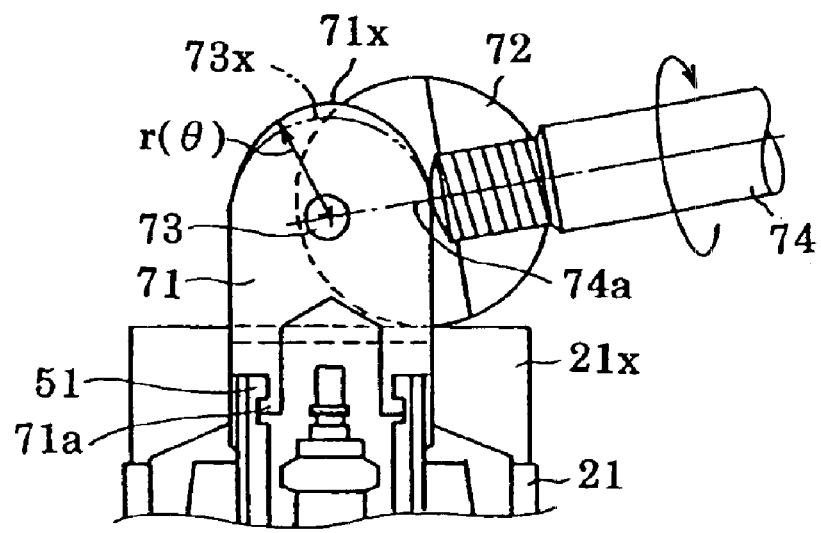
FIG. 18 is a view similar to that of FIG. 17 and shows a state where a locking shaft of the hand-operated valve opening jig is rotated manually to lock the open width of the valve.
Figure 23:
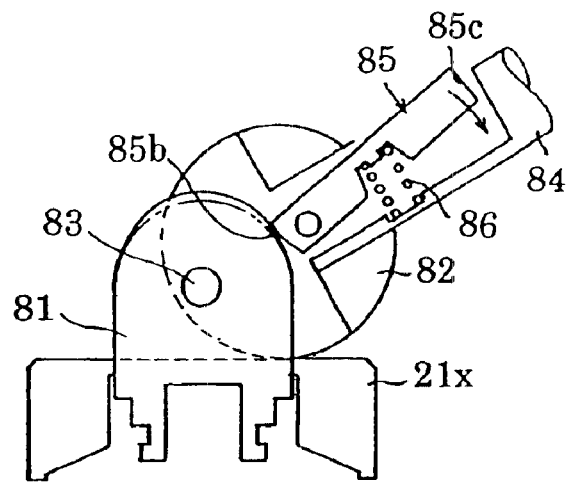
FIG. 23 is a view similar to that of FIG. 22 and illustrates an action of a locking arm for unlocking the open width of the valve, wherein an arrow shown in FIG. 23 indicates a rotational direction of the locking arm to unlock the open width of the valve.
Figure 19:
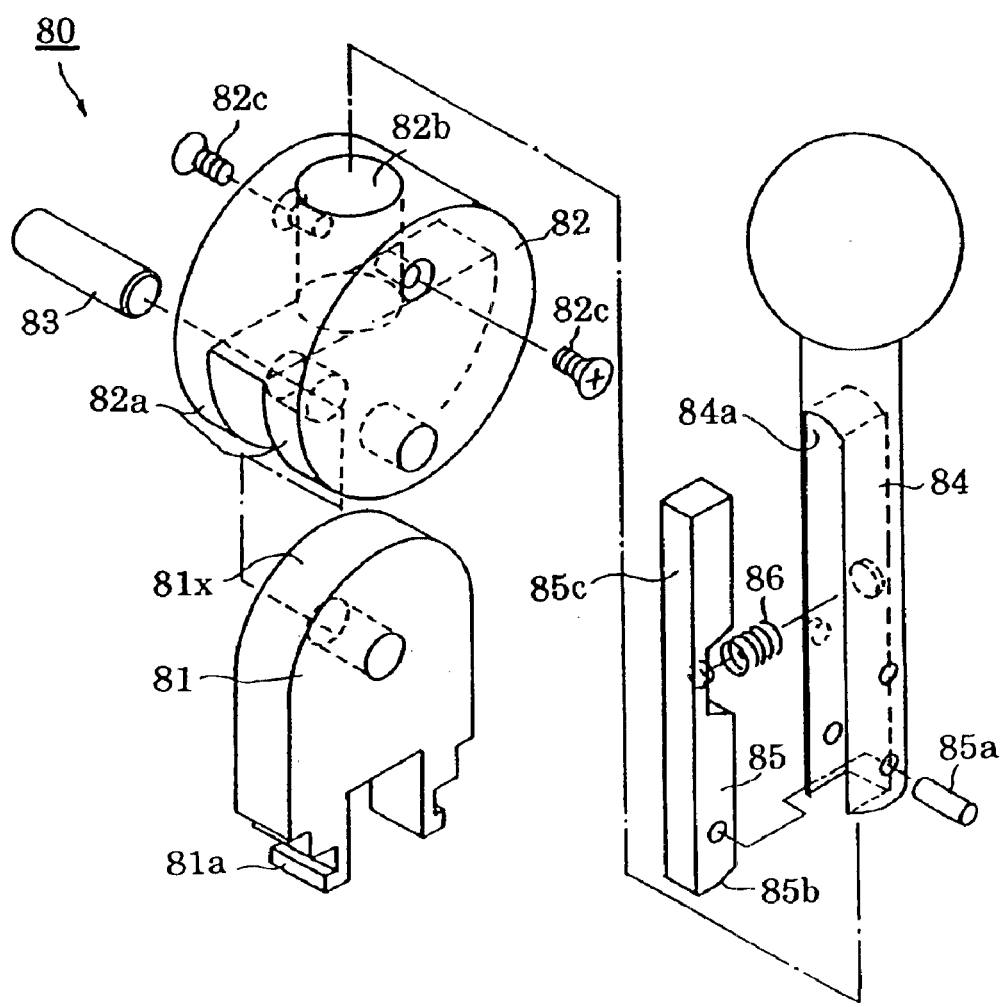
FIG. 19 is an exploded perspective view of a hand-operated valve opening jig used for the third embodiment of the normally-closed type of power-assisted slow operation valve to which the present invention is applied.
Figure 20:
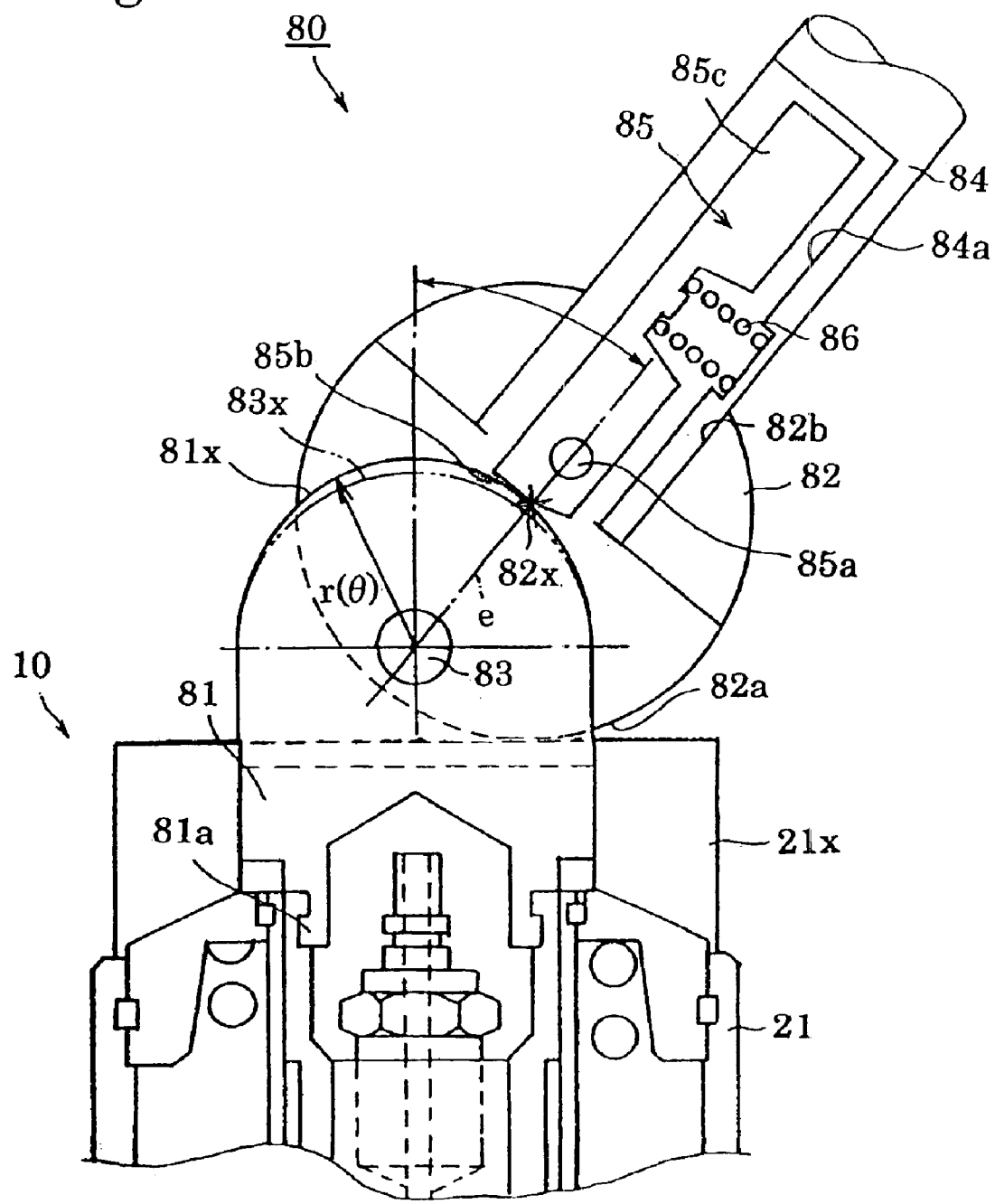
FIG. 20 is a cross sectional view of the hand-operated valve opening jig shown in FIG. 19 and associated member of the third embodiment of the power-assisted slow operation valve, showing a state where the hand-operated valve opening jig is engaged with the associated member and has been operated to open the valve.
Figure 21:
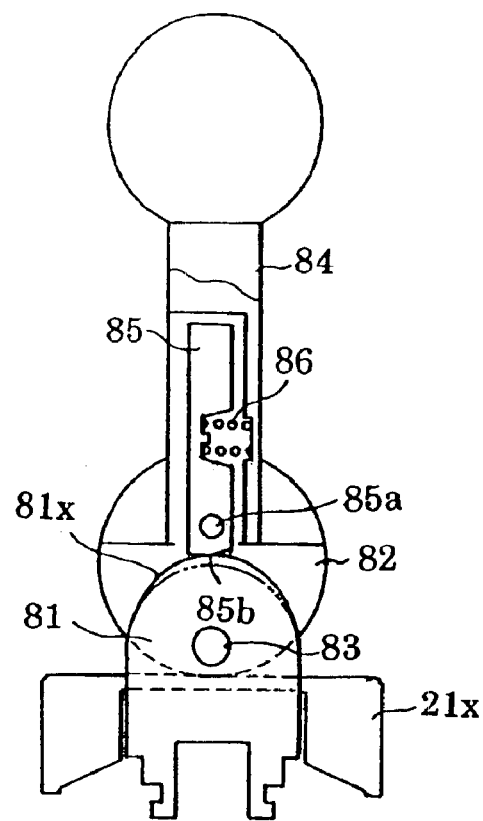
FIG. 21 is a cross sectional view of the hand-operated valve opening jig shown in FIG. 20 and the associated member of the power-assisted slow operation valve shown in FIG. 20, showing a state where the hand-operated valve opening jig is engaged with the associated member but has not yet been operated to open the valve.
Figure 22:
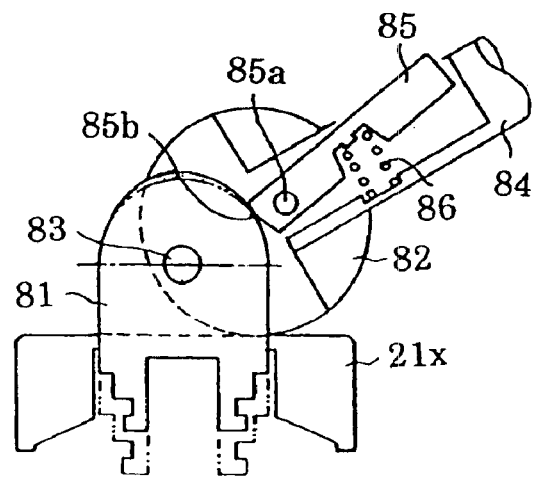
FIG. 22 is a view similar to that of FIG. 21 and shows a state where the hand-operated valve opening jig has been operated to open the valve.

In such a manual operation of opening the stop valve 10, the distance between the tip end 74a of the locking shaft 74 and the curved stopper surface 71x of the manual-opening attachment 71 gradually increases (see FIG. 17). In this structure, if the locking shaft 74 is rotated in a rotational direction to be screwed into the rotational member 72 to bring the tip end 74a into contact with the curved stopper surface 71x when the opening (open width) of the valve reaches an appropriate (or desired) degree of opening, this degree of opening of the valve can be maintained (see FIG. 18). Namely, although the cylindrical holder 51 is biased in a direction to open the valve by the spring force of the compression spring 37 and at the same time the manual-opening attachment 71 is also biased in the same direction, the rotational member 72 needs to rotate relative to the manual-opening attachment 71 to allow the manual-opening attachment 71 to move in a direction to close the valve. However, the manual-opening attachment 71 cannot move in a direction to close the valve since the rotational member 72 is prohibited from rotating by the contact of the tip end 74a with the curved stopper surface 71x.

Conversely, when it is desired to cancel a valve open position so as to close the valve, the locking shaft 74 only needs to be rotated in a direction to loosen the male screw of the locking shaft 74. At this stage, the opening of the valve reduces in accordance with the quantity of loosening of the male screw of the locking shaft 74, and the valve is closed completely when the locking shaft 74 is rotated to an upright position where the axis of the locking shaft 74 stands vertically to coincide with the axis of the cylindrical holder 51.

In the above-described second embodiment of the present invention, the locking shaft 74 is conveniently used not only as a locking member for locking the opening of the stop valve 10, but also as an operational lever (operational member) for rotating the rotational member 72. However, the locking shaft can be provided separately from the operational member. If a locking mechanism including the locking shaft 74 and the curved stopper surface 71x for maintaining the opening of the stop valve 10 at a desired degree of opening is unnecessary, the locking shaft 74 and the curved stopper surface 71x can be omitted. Further, in the second embodiment of the present invention, although the cylindrical holder 51 is fixed to the working rod 27 (working member 26) via the set screw 50 while the cylindrical visual checking member 52 is fixed to an outer peripheral surface of the cylindrical holder 51, the working rod 27 and the cylindrical holder 51 can be formed integral with each other as a single member. In addition, the cylindrical visual checking member 52 can be omitted if unnecessary.

The third embodiment of the present invention will be hereinafter discussed with reference to FIGS. 19 through 24. Parts or elements which are identical to those in the above-described first embodiment are designated by the same reference numerals, and accordingly will not be hereinafter described in detail.

The third embodiment of the present invention is different from the first and second embodiments in that a hand-operated valve opening jig 80 having a structure different from that of the hand-operated valve opening jig 60 or 70 of the first and second embodiments is used for the third embodiment of the valve.

The hand-operated valve opening jig 80 is provided with a manual-opening attachment 81 which can be detachably attached to the annular groove 51a of the cylindrical holder 51 via the pair of radial grooves 51b. The valve opening jig 80 is further provided with a rotational member 82 that is operated to move the working rod 27 in a direction to open the valve via the manual-opening attachment 81. An operational mount 21x, which is provided as a member separate from each of the valve opening jig 80 and the housing 21, is mounted on the housing 21 around the circumference of the opening 21d when the valve opening jig 80 is used. The valve opening jig 80 has access to the cylindrical holder 51 from the outside of the housing 21 via the operational mount 21x and the opening 21d of the upper housing 21b.

The manual-opening attachment 81 is provided with a pair of hooks 81a which can be respectively inserted into the annular grooves 51a via the pair of radial grooves 51b. If the manual-opening attachment 81 is rotated relative the housing 21 after the pair of hooks 81a are inserted into the annular grooves 51a via the pair of radial grooves 51b, the pair of hooks 81a slide into the annular groove 51a to be engaged therewith, so that the pair of hooks 81a do not come off the annular groove 51a if the valve opening jig 80 is pulled upwards.

The rotational member 82 is provided along an outer edge thereof with a cylindrical surface 82a that comes in contact with an upper surface of the operational mount 21x mounted on the housing 21 (the upper housing 21b) of the stop valve 10. The manual-opening attachment 81 and the rotational member 82 are connected to each other via a connection pin (pivot) 83 at an off-centered position thereof from the axial center 82x of the cylindrical surface 82a (i.e., at a position decentered from the axial center 82x of the cylindrical surface 82a toward the cylindrical holder 51 by a distance "e" shown in FIG. 20) so that the rotational member 82 can pivot about the center of the connection pin 82 with respect to the manual-opening attachment 81. The manual-opening attachment 81 is provided on top thereof with a curved stopper surface 81x which bulges upward slightly from an imaginary cylindrical surface 83x about the center of the connection pin 83 that is indicated by a two-dot chain line in FIG. 20. The cylindrical surface 82a does not have to be an exact cylindrical surface.

The rotational member 82 is provided with a lever insertion opening 82b that extends in a radial direction of the rotational member 82. One end of an operational lever 84 is inserted into the lever insertion opening 82b, and is fixed to the rotational member 82 via a set screw 82c (see FIG. 19). The operational lever 84 is provided in an axial direction thereof with an axial groove 84a in which a locking arm 85 is positioned. One end (the lower end as viewed in FIG. 19) of the locking arm 85 is pivoted at one end (the lower end as viewed in FIG. 20) of the operational lever 84 about a pivot 85a so as to pivot within the rotational member 82 (see FIG. 20). The locking arm 85 is provided at the lower end thereof with a locking portion 85b that is engaged with and disengaged from the curved stopper surface 81x of the manual-opening attachment 81. A compression spring 86 is positioned between the operational lever 84 and the locking arm 85 so that the locking portion 85b is normally biased in a direction to be engaged with the curved stopper surface 81x of the manual-opening attachment 81 (i.e., in a counterclockwise direction as viewed in FIG. 20).

The curved stopper surface 81x is formed so that the distance r (θ) between the connection pin 83 and the curved stopper surface 81x becomes maximum when measured from the center of the connection pin 83 to a position on the curved stopper surface 81x directly above the connection pin 83 and so that the distance r (θ) reduces gradually and smoothly as the position on the curved stopper surface 81x moves down toward either side of the curved stopper surface 81x. Namely, the curved stopper surface 81x is formed so that the distance between the curved stopper surface 81x and the pivot 85a increases as the cylindrical holder 51 is moved in a direction to open the valve via the manual-opening attachment 81 and the connection 83 when the rotational member 82 is rotated with the cylindrical surface 82a thereof remaining in contact with the upper surface of the operational mount 21x. The locking portion 85b of the locking arm 85 keeps contact with the curved stopper surface 81x by the spring force of the compression spring 86 while the distance between the curved stopper surface 81x and the pivot 85a increases when the rotational member 82 is rotated. However, in this state where the locking portion 85b remains in pressure-contact with the curved stopper surface 81x by the spring force of the compression spring 86, the rotational member 82 is allowed to rotate in a direction to increase the distance between the curved stopper surface 81x and the pivot 85a, but is prevented from rotating in the opposite direction to decrease the distance between the curved stopper surface 81x and the pivot 85a.

Figure 24:
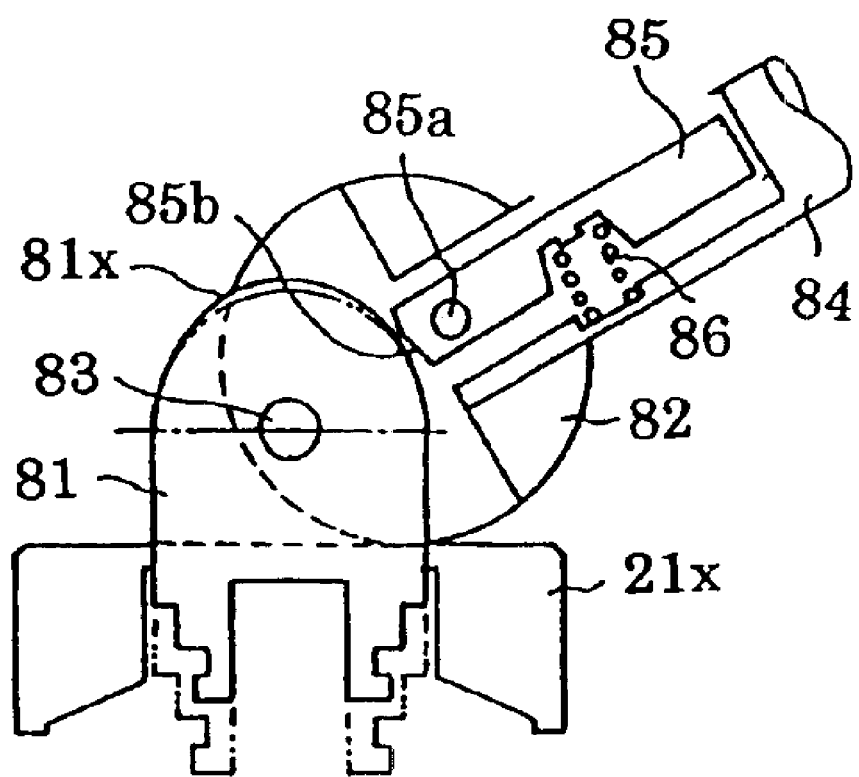
FIG. 24 is a view similar to that of FIG. 22 and illustrates a state of the moment at which the locking arm is pressed manually to disengage the locking arm from the curved stopper surface of a manual-opening attachment.

However, if a releasing end 85c (the upper end as viewed in FIG. 19) of the locking arm 85 is manually pressed into the axial groove 84a against the spring force of the compression spring 86, the locking portion 85b is disengaged from the curved stopper surface 81x (i.e., the distance between the locking portion 85b and the curved stopper surface 81x increases) to allow the rotational member 82 to rotate freely with respect to the manual-opening attachment 81 (see FIG. 24).

When the stop valve 10 is manually opened with the hand-operated valve opening jig 80, firstly the flexible tube 55 is disconnected from the line joint 54, secondly the pair of hooks 81a of the manual-opening attachment 81 are inserted into the annular groove 51a via the pair of radial grooves 51b, and thirdly the manual-opening attachment 81 is rotated relative the housing 21 to bring the pair of hooks 81a into engagement with the annular groove 51a. At this stage, the connection pin 83 is positioned closest to the operational mount 21x, while the cylindrical surface 82a of the rotational member 82 contacts the operational mount 21x mounted on the head of the housing 21 (see FIG. 21). In the position shown in FIG. 21, rotating the rotational member 82 by manually moving the operational lever 84 causes the manual-opening attachment 81 to be raised via the connection 83 which is eccentric to the axial center of the rotational member 82. This causes the pair of hooks 81a of the manual-opening attachment 81 to lift the cylindrical holder 51 via the annular groove 51a, which in turn lifts the working rod 27 against the spring force of the compression spring 37 to thereby open the valve (see FIGS. 22 and 23).

In such a manual operation of opening the valve, the locking portion 85b of the locking arm 85, which is pivoted within the operational lever 84 about the pivot 85a, keeps contact with the curved stopper surface 81x of the manual-opening attachment 81 by the spring force of the compression spring 86 while rotating about the pivot 85a. This contact of the locking portion 85b with the curved stopper surface 81x prevents the rotational member 82 from rotating in a direction to close the valve (see FIGS. 20 and 22). Namely, although the cylindrical holder 51 is biased in a direction to close the valve by the spring force of the compression spring 37, and at the same time, the manual-opening attachment 81 is also biased in the same direction, the rotational member 82 needs to rotate relative to the manual-opening attachment 81 to allow the manual-opening attachment 81 to move in a direction to close the valve. However, the manual-opening attachment 81 cannot move in a direction to close the valve since the rotational member 82 is prohibited from rotating by the contact of the locking portion 85b with the curved stopper surface 81x.

Conversely, when it is desired to cancel a valve open state in order to close the valve, the releasing end 85c of the locking arm 85 only needs to be manually pressed into the axial groove 84a against the spring force of the compression spring 86 sufficiently enough to disengage the locking portion 85b from the curved stopper surface 81x.

In the above-described third embodiment of the present invention, the locking arm 85, which is operated to lock the opening of the stop valve 10, can be easily used since the locking arm 85 is positioned in the operational lever 84. However, the locking arm can be provided separately from the operational lever. Further, in the third embodiment of the present invention, although the cylindrical holder 51 is fixed to the working rod 27 via the set screw 50 while the cylindrical visual checking member 52 is fixed to an outer peripheral surface of the cylindrical holder 51, the working rod 27 and the cylindrical holder 51 can be formed integral with each other as a single member. In addition, the cylindrical visual checking member 52 can be omitted if unnecessary.

Each of the first, second and third embodiments of the valves to which the present invention is applied is of a power-assisted slow operation type wherein the amount of movement of the piston body 29 (the working rod 27) is far greater than that of the valve rod 22 (the valve stem assembly 24), which actually opens and shuts off the connection between the conduit 12a and the conduit 13a. However, the present invention can be applied to not only such a type of valve but also another type of valve wherein a valve rod (which corresponds to the valve rod 22) and a piston body (which corresponds to the piston body 29) are formed integral with each other.

The present invention can be applied to not only a normally-closed type of valve which introduces pressure for closing the valve by spring force such as each of the above-described first through third embodiments, but also to a normally-open type valve which introduces pressure for closing the valve by pilot pressure. However, in this case, there is no need to use the hand-operated valve opening jig 60, 70 or 80.

As can be understood from the foregoing, according to a power-assisted slow operation valve to which the present invention is applied, an apparatus having a simple structure with which the operational status of a stop valve can be visually checked can be achieved. Furthermore, an apparatus with which a normally-closed valve can be manually opened, and which makes it possible to adjust and maintain the opening of the valve easily can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An apparatus for manually opening a normally-closed valve, said apparatus comprising said normally-closed valve and a hand-operated valve opening jig, wherein said normally-closed valve comprises:
a working rod for operating a valve element which is moved to close and open a conduit;
a cylindrical holder which is coaxially fixed to said working rod, and to which said hand-operated valve opening jig can be detachably attached from the outside of said housing;
a biasing member which biases said working rod in a first direction to make said valve element close said conduit; and a pressure chamber which is formed within said housing, and is supplied with a working fluid to move said working rod in a second direction to make said valve element open said conduit;

wherein said hand-operated valve opening jig comprises:

a manual-opening attachment which can be detachably attached to said cylindrical holder;

a rotational member having a cylindrical surface which comes into contact with an operational mount mounted on said housing, said rotational member being pivoted about said manual-opening attachment via a pivot provided at a position which deviates from an approximate center of said cylindrical surface toward said cylindrical holder; and an operational member which operated to couple said manual-opening attachment to said cylindrical holder, and is operated to rotate said rotational member with said cylindrical surface contacting said operational mount.

2. The apparatus according to claim 1 wherein said hand-operated valve opening jig comprises a locking shaft which is screwed into said rotational member so that a tip end of said locking shaft can be engaged with a stopper surface formed on said manual-opening attachment;

wherein said stopper surface is formed so that a distance between said stopper surface and said tip end of said locking shaft increases as said cylindrical holder 51 is moved in a valve-opening direction via said manual-opening attachment and said pivot when said rotational member is rotated with said cylindrical surface thereof remaining in contact with said operational mount, and wherein said distance varies in accordance with an amount of screw-engagement of said locking shaft with respect to said rotational member.

3. The apparatus according to claim 2, wherein the locking shaft is formed integral with said operational member.

4. The apparatus according to claim 1, wherein said hand-operated jig comprises:

a locking arm which is pivoted within said rotational member, wherein one end of said locking arm can be engaged with said stopper surface of said manual-opening attachment; and a spring which biases said locking arm so that said one end of said locking arm is biased in a direction to be engaged with said stopper surface of said manual-opening attachment, wherein said stopper surface is formed so that a distance between said stopper surface and the pivot point of said locking arm increases as said cylindrical holder is moved in a valve-opening direction via said manual-opening attachment and said pivot when said rotational member is rotated with said cylindrical surface thereof remaining in contact with said operational mount, and wherein a distance between said one end of said locking arm and said stopper surface increases if said locking arm is rotated manually against spring force of said spring.

5. The apparatus according to claim 4, wherein said hand-operated valve opening jig further comprises an operational lever fixed to said rotational member for manually rotating said rotational member, said locking arm being positioned in said operational lever.

6. The apparatus according to claim 1, wherein said stop valve comprises a power-assisted device with which said biasing force of said biasing member is multiplied to be transmitted to said working rod.

* * * * *